United States Patent
Aoki et al.

(10) Patent No.: US 6,964,006 B2
(45) Date of Patent: Nov. 8, 2005

(54) NETWORK ERROR DISPLAY APPARATUS AND ERROR DETECTION DISPLAY METHOD

(75) Inventors: Yukihiko Aoki, Tokyo (JP); Yoshiaki Takenaka, Tokyo (JP); Haruyuki Miura, Kanagawa (JP); Shinobu Ohashi, Ibaraki (JP)

(73) Assignee: Sony Corporation, Tokyo (JP)

( * ) Notice: Subject to any disclaimer, the term of this patent is extended or adjusted under 35 U.S.C. 154(b) by 792 days.

(21) Appl. No.: 09/941,288

(22) Filed: Aug. 28, 2001

(65) Prior Publication Data

US 2002/0047862 A1    Apr. 25, 2002

(30) Foreign Application Priority Data

Aug. 29, 2000 (JP) .............................. 2000-259275

(51) Int. Cl.[7] .......................................... H03M 13/00
(52) U.S. Cl. ...................... 714/784; 714/3; 709/224; 345/736; 370/254
(58) Field of Search ....................... 345/736; 709/224; 714/784, 43; 370/254

(56) References Cited

U.S. PATENT DOCUMENTS 6,654,353 B1 * 11/2003 Tokura et al. .............. 370/254

* cited by examiner

Primary Examiner—Guy J. Lamarre
(74) Attorney, Agent, or Firm—Frommer Lawrence & Haug LLP; William S. Frommer

(57) ABSTRACT

Network error display capable of displaying a user's measure intelligibly while making a distinction between an error of the receiving system on the network and an error within a device. An IEEE 1394 signal processing section detects an error of a loop state in an IEEE 1394 network, detects a link state, and detects an error when there is a link for the network or an error when there is no link for the network. A main body processing section stores messages indicating error states and performs display processing on messages stored on the basis of the error state. A display section displays a message for a user.

6 Claims, 22 Drawing Sheets

FIG. 3

| Offset | Designation | Function |
|---|---|---|
| 000h | STATE_CLEAR | State and control data |
| 004h | STATE_SET | Set state_clear bit |
| 008h | NODE_IDs | Indicate node ID of 16 bits |
| 00Ch | RESET_START | Start command reset |
| 018h-01Ch | SPLIT_TIMEOUT | Specify maximum time of split |
| 200h | CYCLE_TIME | Cycle time |
| 210h | BUSY_TIMEOUT | Specify limit on retry |
| 21Ch | BUS_MANAGER | Indicate ID of bus manager |
| 220h | BANDWIDTH_AVAILABLE | Indicate band that can be assigned to isochronous communication |
| 224h-228h | CHANNELS_AVAILABLE | Indicate the state where the channels are used |

FIG. 7A
oMPR

| data rate capability | Broadcast channel base | non-persistent extension field | persistent extension field | reserved | number of output plugs |
|---|---|---|---|---|---|
| 2 | 6 | 8 | 8 | 3 | 5 (bit) |

FIG. 7B
oPCR [n]

| on-line | Broadcast connection counter | point-to-point connection counter | reserved | channel number | reserved | data rate | overhead ID | payload |
|---|---|---|---|---|---|---|---|---|
| 1 | 6 | 6 | 2 | 6 | 3 | 2 | 4 | 10 (bit) |

FIG. 7C
iMPR

| data rate capability | reserved | non-persistent extension field | persistent extension field | reserved | number of input plugs |
|---|---|---|---|---|---|
| 2 | 6 | 8 | 8 | 3 | 5 (bit) |

FIG. 7D
iPCR [n]

| on-line | Broadcast connection counter | point-to-point connection counter | reserved | channel number | reserved |
|---|---|---|---|---|---|
| 1 | 6 | 6 | 2 | 6 | 16 (bit) |

FIG. 10

| The General Subunit Identifier Descriptor ||
|---|---|
| address | contents |
| 00 00$_{16}$ | descriptor_length |
| 00 01$_{16}$ | |
| 00 02$_{16}$ | generation_ID |
| 00 03$_{16}$ | size_of_list_ID |
| 00 04$_{16}$ | size_of_object_ID |
| 00 05$_{16}$ | size_of_object_position |
| 00 06$_{16}$ | number_of_root_object_lists(n) |
| 00 07$_{16}$ | |
| 00 08$_{16}$ ⋮ | root_object_list_id_0 |
| ⋮ | ⋮ |
| ⋮ | root_object_list_id_n-1 |
| ⋮ | subunit_dependent_length |
| ⋮ | subunit_dependent_information |
| ⋮ | manufacturer_dependent_length |
| ⋮ | manufacturer_dependent_information |

FIG. 11

| generation_ID values ||
|---|---|
| generation_ID | meaning |
| 00₁₆ | Data structures and command sets as specified in the AV/C General Specification, version 3.0 |
| all others | reserved for future specification |

FIG. 12

| List ID Value Assignment Ranges ||
|---|---|
| range of values | list definition |
| 0000₁₆-0FFF₁₆ | reserved |
| 1000₁₆-3FFF₁₆ | subunit-type dependent |
| 4000₁₆-FFFF₁₆ | reserved |
| 1 000₁₆ -max list ID value | subunit-type dependent |

| ctype/response | | |
|---|---|---|
| Command | 0000 | CONTROL |
| | 0001 | STATUS |
| | 0010 | SPECIFIC INQUIRY |
| | 0011 | NOTIFY |
| | 0100 | GENERAL INQUIRY |
| | 0101 ~ 0111 | (reserved for future spcification) |
| Response | 1000 | NOT IMPLEMENTED |
| | 1001 | ACCEPTED |
| | 1010 | REJECTED |
| | 1011 | IN TRANSITION |
| | 1100 | IMPLEMENTED/STABLE |
| | 1101 | CHANGED |
| | 1110 | (reserved for future specification) |
| | 1111 | INTERIM |

FIG. 17A

| subunit_type | |
|---|---|
| 00000 | Video monitor (reserved) |
| ~ 00000 | Disc recorder/Player |
| 00100 | Tape recorder/Player |
| 00101 | Tuner |
| 00111 | Video Camera (reserved) |
| 11100 ~ 11101 | Vendor unique (reserved) |
| 11110 | Subunit type extended to next byte |
| 11111 | Unit* |

FIG. 17B

| opcode:Operation Code | |
|---|---|
| 00h | VENDOR-DEPENDENT |
| 50h | SEARCH MODE |
| 51h | TIMECODE |
| 52h | ATN |
| 60h | OPEN MIC |
| 61h | READ MIC |
| 62h | WRITE MIC |
| C1h | LOAD MEDIUM |
| C2h | RECORD |
| C3h | PLAY |
| C4h | WIND |
| ~ | |

FIG. 17C

| AV/C | control | tape recorder /player | when ID 0 | | PLAY | FORWARD |
|---|---|---|---|---|---|---|
| CTS= 0000 | ctype= 0000 | subunit type=00100 | id=000 | opcode=C3h | operand= 75h |

FIG. 18A

| AV/C | accepted | tape recorder /player | when ID 0 | | PLAY | FORWARD |
|---|---|---|---|---|---|---|
| CTS= 0000 | response =1001 | subunit type=00100 | id=000 | opcode=C3h | operand= 75h |

| Error code number (example) | Display message | |
|---|---|---|
| C78:11 (At the time of device selection) (TUNER, ANALOG) | The selected is conduction 63 Links and it cannot cope with more Lines | 12 Connection failure of output plug of opposite device side |
| C78:12 | STR has 63 formed Links and it cannot have more links | 31 Connection failure of its own input |
| C78:22.22 | The case where a different format (signal where cannot be reproduced) it detected | 22 The format is not IEC958 format |
| C78:22.23 | | 23 Discrepancy between N bits (asynchronous) and rate control protocol |
| C78:22.25 | | 25 The sampling frequency is not suitable |
| C78:22.26 | | 26 The signal is not linear PCM |
| C78:22.31 | The case where the signal clock is out of standard values and the PLL lock is not established | 24 The signal is unlocked |
| C78:04 | The case where there are not input signals at all during selection of a connection device | 21 There are no signal |
| C78:15.13 | Since bus is full of signals output or input cannot be conducted | 13 Band is deficient at the time of input |
| C78:15.14 | | 14 Channel is fully occupied time of output |
| C78:15.15 | | 15 Band is deficient at the time of output |
| C78:15.33 | | 33 Channel is fully occupied time of output |
| C78:03 | Loop has been formed by cable connection | |
| C78:00 | Bus reset has occurred (for example in the case where new device is connected) | |
| C60:01 | Temperature within the device is rising | |
| C60:08 | Speaker terminal is short-circuited | |
| C60:13 | Selected device is not connected | |

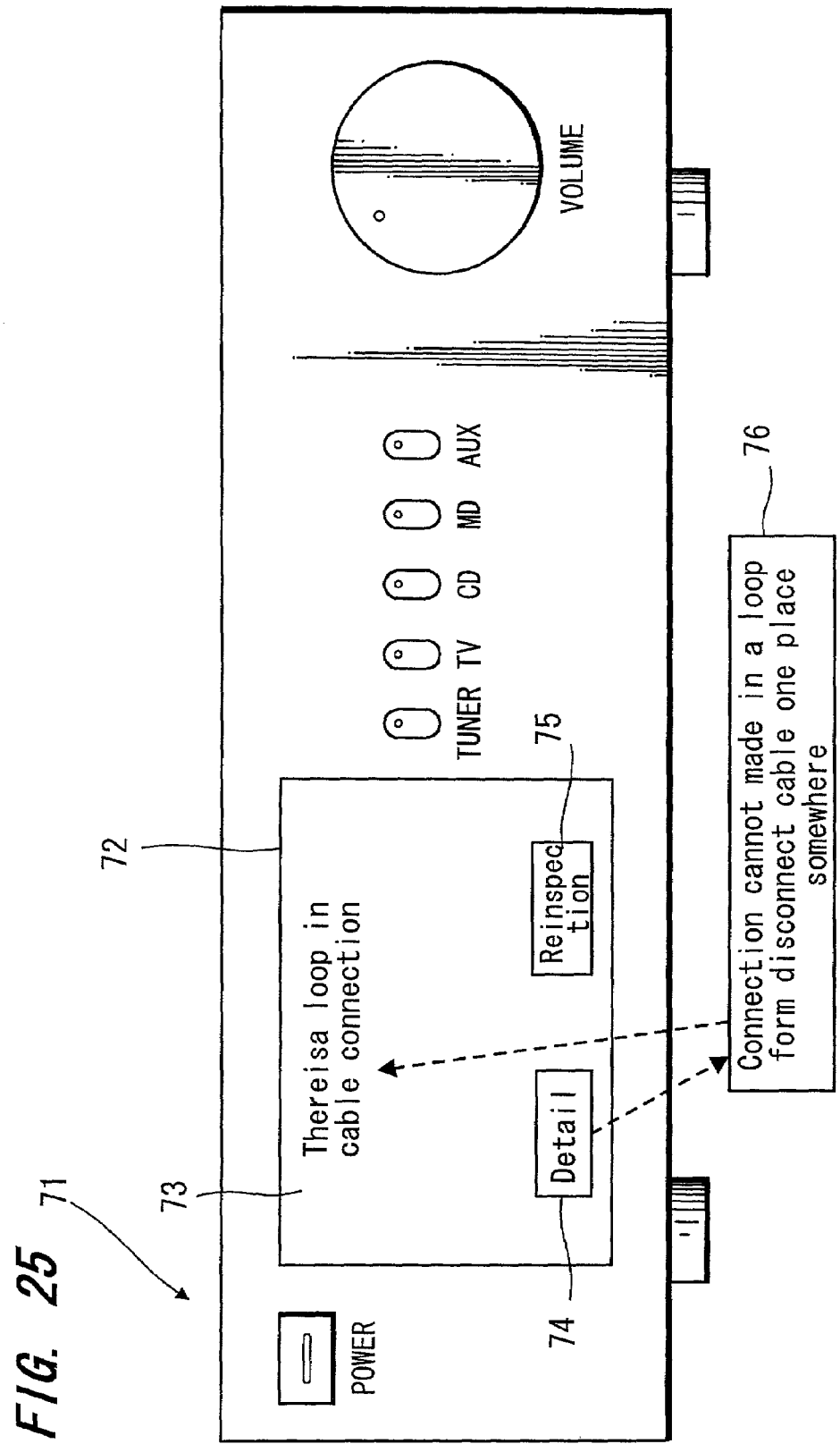

NETWORK ERROR DISPLAY APPARATUS AND ERROR DETECTION DISPLAY METHOD

BACKGROUND OF THE INVENTION

1. Field of the Invention

The present invention can be applied to, for example, a system which transmits and receives data via an interface conforming to the communication format of an IEEE 1394.

2. Description of Related art

As a conventional apparatus comprising an AV (Audio/Video) system, there is an apparatus in which a read only CD (Compact Disc) player, and a recordable and reproducible MD (Mini Disc) recorder/player are connected to an STR (Stereo Tuner Receiver) having a tuner function to which an analog signal can be input, via an interface.

In the above described AV system, it is possible to switch over among an analog function mode, a tuner function mode, a CD function mode, and an MD function mode by conducting input selection in the STR.

However, any alarm display has not been given for a loop connection in the STR of the conventional AV system, although the loop connection is inhibited on the protocol of the IEEE 1394 serial interface. Therefore, there is a disadvantage that a user cannot recognize the loop state.

Even in the case where error display is conducted, there is no distinction between an error of a receiving system and an error within the STR, and contents of error display are vague. Furthermore, in this case, some symptoms are handled collectively as one alarm display. This results in a disadvantage that the user cannot determine what kind of measure should be taken.

Furthermore, in the case where a personal computer (PC) is connected to a MD or DV (digital video tape recorder) to form a network and the PC has detected the loop connection, the PC cannot conduct error display showing loop connection, in the conventional art, unless the PC starts driver software of the MD or DV, which is low order, and thereafter starts control software of the MD or DV, which is high order application software. Therefore, if an error is detected, the high order application software cannot be started immediately. As a result, error display cannot be conducted.

In view of the points heretofore described, the present invention has been made. The present invention attempts to propose a network error display apparatus and an error detection display method capable of displaying a user's measure intelligibly while making a distinction between an error of the receiving system on the network and an error within a device.

SUMMARY OF THE INVENTION

In order to solve the above described problems, a network error display apparatus of the present invention is applied to an IEEE 1394 network.

A network error display apparatus of the present invention especially includes first detection means for detecting an error of a loop state of the network, second detection means for detecting a link state for the network, third detection means for detecting an error which occurs in the case where such a state that there is no link for the network is detected by the second detection means, fourth detection means for detecting an error which occurs in the case where such a state that there is a link for the network is detected by the second detection means, storage means for storing respective messages indicating error states detected respectively by the detection means, display means for displaying a message for a user, and control means for reading out a message which indicates error states from the storage means based on error states detected respectively by the plurality of detection means, and displaying the message on the display means.

Furthermore, an error detection display method of the present invention is applied to a network using the IEEE 1394.

An error detection display method of the present invention especially includes a step of detecting a loop state error of the network, and, in the case where the loop state error is detected, displaying the loop state error; a step of detecting a connection state with another apparatus via the network; in the case where connection is detected in the connection state detecting step, detecting an error of the network, and in the case where an error of the network is detected, displaying an error message based on detected error contents; and in the case where connection is not detected in the connection state detecting step, detecting an error of the network, and in the case where an error of the network is detected, displaying an error message based on detected error contents.

According to the network error display apparatus of the present invention, operation hereafter described is conducted.

First, an error check is conducted to determine whether there is a change in the error. To be concrete, it is determined whether the error has disappeared.

When there is a change in the error, it is determined whether there is an error. To be concrete, in such a state that the error has already been detected, it is determined whether another error is detected. When an change of error information is detected, an display priority order of the error information is judged.

When there is the error, a request is issued to display error display information on an display module. To be concrete, if error information is detected, then the error is displayed according to the display priority order of the error information. Even if some error information pieces are detected simultaneously, therefore, only one of them is displayed as an error in order to prevent the user from being confused. If error information having a high display priority order is detected even in the case an error has already been displayed, the error display which is currently displayed is interrupted and display processing of the error information having the high display priority order is conducted.

Hereafter, detailed operation of this error check will be described.

The error check is started and error display information is cleared. First, it is determined whether bus reset has occurred. If bus reset has occurred, then error display information of bus reset occurrence is set.

Secondly, if bus reset has not occurred, then it is determined whether the bus state has become a loop state or whether the bus state has become a non-loop state. If the bus state has become the loop state or the bus has become the non-loop state, then error display information of the loop state change is set.

Thirdly unless the bus state has become the loop state or the bus state has become the non-loop state, then it is determined whether there is connection. If there is no connection, then the error check in the case where there is no connection is conducted and it is determined whether there is an error. If there is an error, then error display information without connection is set. If there is connection, then the error check in the case where there is connection is conducted and it is determined whether there is an error. If there is an error, then error display information such as a signal error is set.

If the first error display information of bus reset occurrence is set, the second error display information of the loop state change is set, or the third error display information of no connection is set, then error display information is output.

As a result, display priority order is defined in the order of bus reset and loop connection. If the error information is detected, therefore, then error display information is output so as to display the error with the top priority than other errors. Even while other error information is being displayed, therefore, the display is interrupted and error information having higher display priority order is displayed.

BRIEF DESCRIPTION OF THE DRAWINGS

FIG. 3 is a diagram showing examples of positions, names, and functions of principal CRSs;

FIGS. 7A to 7D are diagrams showing configuration examples of oMPR, oPCR, iMPR, and iPCR;

FIG. 10 is a diagram showing an example of a data format of a descriptor;

FIG. 11 is a diagram showing an example of a generation ID of FIG. 10;

FIG. 12 is a diagram showing an example of a list ID of FIG. 10;

FIGS. 17A to 17C are diagrams showing concrete examples of an AV/C command;

FIGS. 18A and 18B are diagrams showing a concrete example of a command and a response of an AV/C command;

FIG. 24 is a diagram showing error messages;

FIG. 25 is a diagram showing an error message and user's measure display;

DETAILED DESCRIPTION OF THE PREFERRED EMBODIMENT

Hereafter, a network error display apparatus of an embodiment of the present invention will be described in detail by referring to drawings suitably. Hereafter, as a device applied to the present embodiment, an IEEE 1394 device conforming to the IEEE 1394 serial interface will be described.

[IEEE 1394 Interface]

First of all, the IEEE 1394 interface will now be described.

Figure 1:
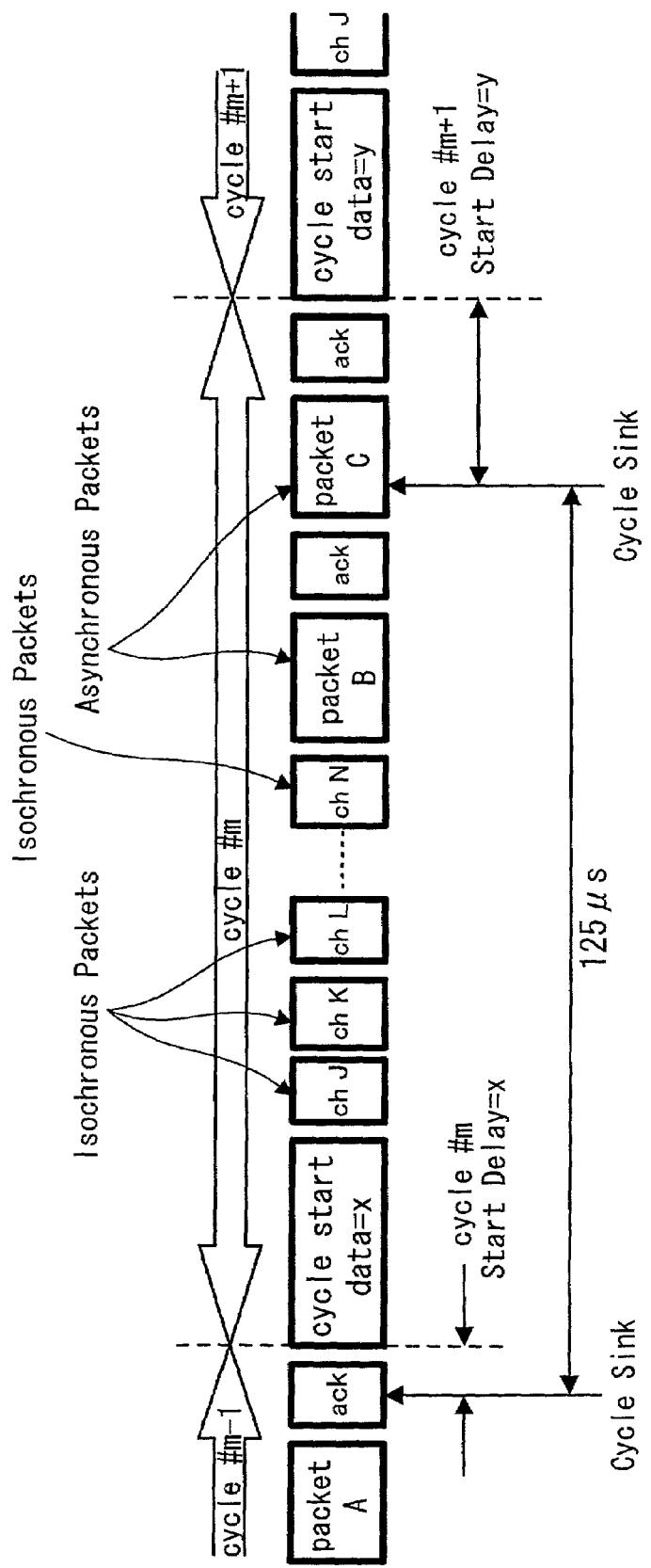
FIG. 1 is a diagram showing an example of a cycle structure of data transmission on a bus of the IEEE 1394 scheme.

FIG. 1 is a diagram showing a cycle structure of data transmission of devices connected by the IEEE 1394. According to the IEEE 1394, data is divided into packets and the packets are transmitted in a time division manner by taking a cycle having a length of 125 $\mu$s as a reference. This cycle is produced by a cycle start signal supplied from a node having a cycle master function (some device connected to the bus). Isochronous packets secure a band (which is called band although it is a time unit) required for transmission from the head of every cycle. In isochronous transmission, therefore, transmission of data in a fixed time is ensured. If a transmission error occurs, however, there is no mechanism for protection and data is lost. In asynchronous transmission, during time of each cycle which is not used for isochronous transmission, a node which has secured the bus as a result of arbitration sends out asynchronous packets. Therein, reliable transmission is ensured by using acknowledgment and retry. However, the transmission timing does not become fixed.

In order that a predetermined node may conduct isochronous transmission, the node must correspond to the isochronous function. In addition, at least one of nodes corresponding to the isochronous function must have a cycle master function. In addition, at least one of nodes connected to the IEEE 1394 serial bus 9-1 to 9-4 must have an isochronous resource manager function.

Figure 2:
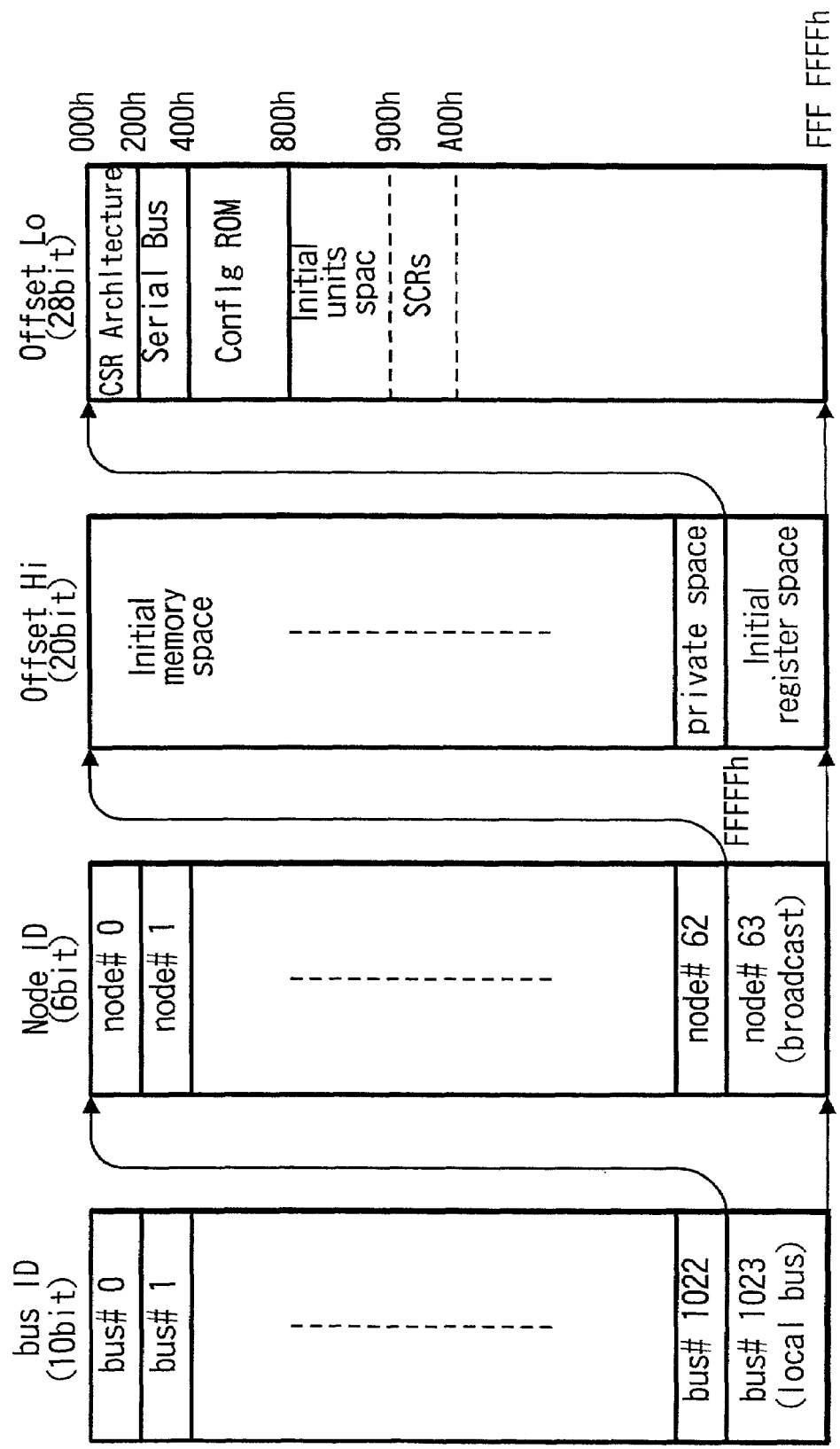
FIG. 2 is a diagram showing an example of a structure of an address space of the CRS architecture.

The IEEE 1394 conforms to a CSR (Control & Status Register) architecture having an address space of 64 bits prescribed by ISO/IEC 13213. FIG. 2 is a diagram showing the structure of the address space of the CSR architecture. Sixteen high-order bits are used for a node ID indicating each node on the IEEE 1394. Forty-eight remaining bits are used to specify an address space given to each node. The sixteen high-order bits are further divided into ten bits of a bus ID and six bits of a physical ID (a node ID of a narrow sense). A value having 1 in every bit is used for special purpose. Therefore, 1023 buses and 63 nodes can be specified.

In an address space of 256 tera bytes prescribed by forty-eight low-order bits, a space prescribed by twenty high-order bits is divided into an initial register space of 2,048 bytes to be used for registers specific to the CSR and registers specific to the IEEE 1394, a private space, and an initial memory space. In the case where the space prescribed by twenty high-order bits is the initial register space, the space prescribed by twenty-eight low-order bits is used as configuration ROMs (read only memories), an initial unit space to be used for application specific to the node, and plug control registers (PCRs).

FIG. 3 is a diagram showing offset addresses, names, and functions of principal CSRs. The Offset of FIG. 3 denotes an offset address compared with an address FFFFF0000000h where the initial register space begins. (Numerals having h at their end are expressed by hexadecimal notation.) A bandwidth available register having an offset 220h indicates a band which can be assigned to isochronous communication, and only the value of the node operating as the isochronous resource manager is made valid. That is, each node has CSRs shown in FIG. 2. As for the bandwidth available register, however, only that of the isochronous resource manager is made valid. In other words, substantially only the isochronous resource manager has the bandwidth available register. The bandwidth available register holds a maximum value when no bands are assigned to isochronous communication. Every time a band is assigned, the value is decreased.

In channel available registers of offsets 224h to 228h, respective bits correspond to channel numbers 0 to 63, respectively. If a bit is 0, it is indicated that the channel has already been assigned. Only the channel available register of the node serving as the isochronous resource manager is valid.

Figure 4:
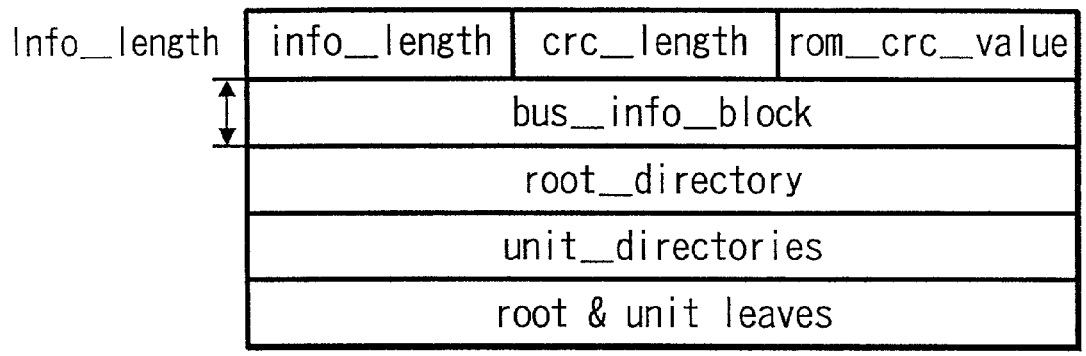
FIG. 4 is a diagram showing an example of a general ROM format.

Referring back to FIG. 2, a configuration ROM based upon a general ROM (read only memory) format is arranged in addresses 200h to 400h in the initial register space. FIG. 4 is a diagram showing a general ROM format. A node, which is the unit of access on the IEEE 1394, can have a plurality of units which use the address space in common and which operate independently in a node. A unit directory can indicate the version and location of software for the unit. Locations of a bus info-block and a root directory are fixed, but locations of other blocks are specified by offset address.

Figure 5:
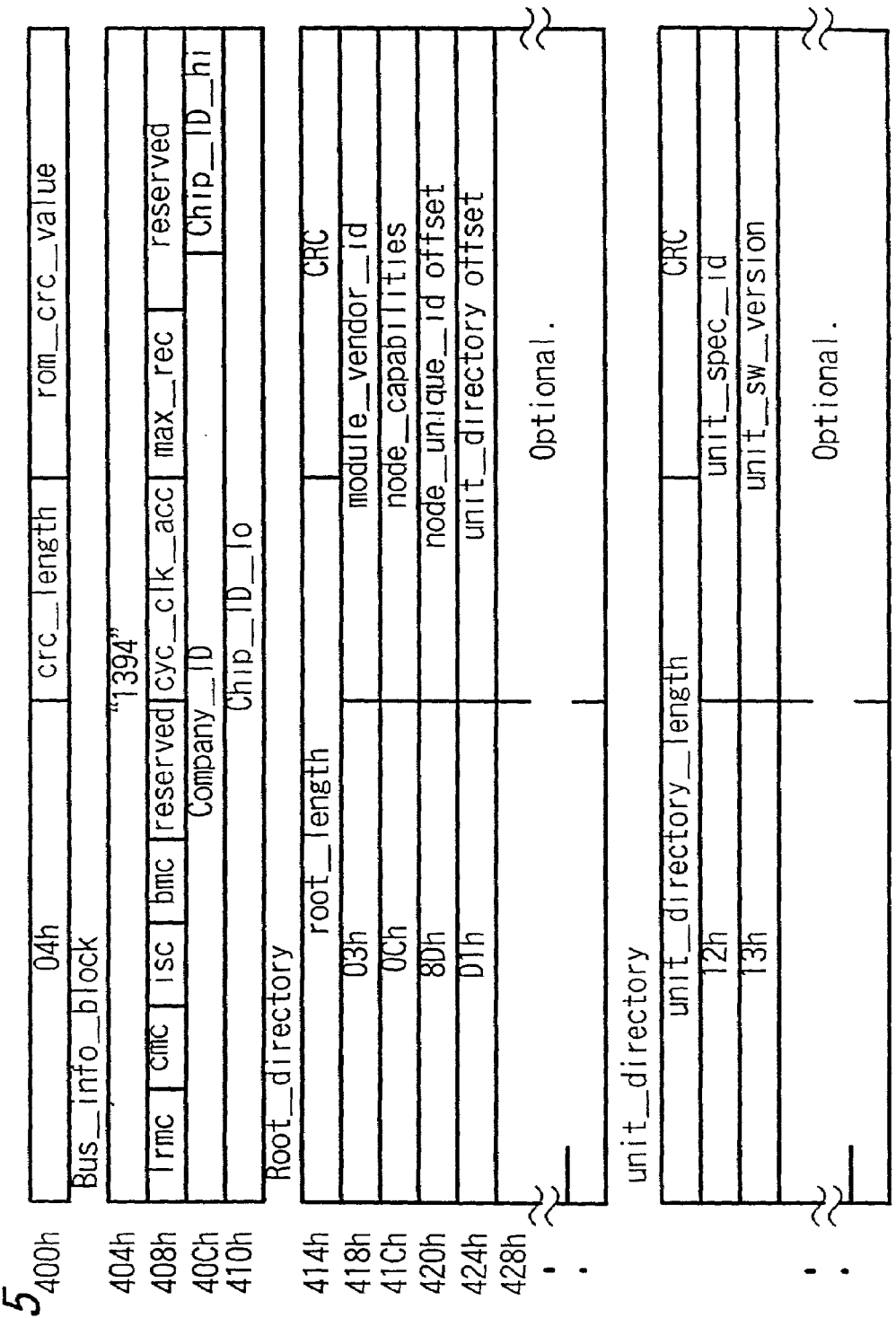
FIG. 5 is a diagram showing an example of the bus info-block, root directory, and unit directory.

FIG. 5 is a diagram showing details of the bus info-block, root directory, and unit directory. As a company ID in the bus info-block, an ID number indicating a manufacturer of the device is stored. As a chip ID, there is stored an ID which is unique to the device and only one in the world and which does not have duplication with other devices. Furthermore, according to standards of the IEC 61833, 00h, Aoh and 2Dh are written into the first octet, second octet and third octet of the unit spec id of the unit directory of a device meeting the IEC 61883, respectively. Furthermore, 01h is written into the first octet of the unit switch version, and 1 is written into the LSB (least significant bit) of the third octet.

Figure 6:
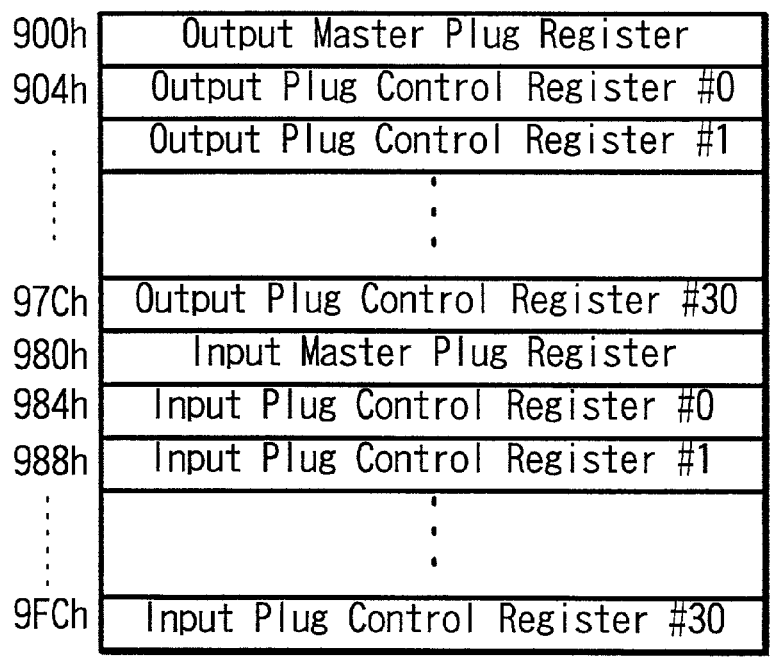
FIG. 6 is a diagram showing configuration examples of PCRs.

In order to control the input and output of a device via an interface, each node has a PCR (plug control register) prescribed in IEC 61883, in addresses 900h to 9FFh in the initial unit space of FIG. 2. This has been obtained by substantializing the concept of a plug in order to logically form a signal path similar to an analog interface. FIG. 6 is a diagram showing a configuration of the PCRS. The PCR has an oPCR (output Plug Control Register) representing an output plug and an iPCR (input Plug Control Register) representing an input plug. Furthermore, each PCR has a register oMPR (output Master Plug Register) and a register iMPR (input Master Plug Register) respectively indicating information of an output plug or an input plug specific to each device. Each device does not have a plurality of oMPRs and iMPRs. However, each device is able to have a plurality of oPCRs and iPCRs corresponding to individual plugs, according to the capability thereof. Each of PCRs shown in FIG. 6 has 31 oPCRs and 31 iPCRs. The flow of isochronous data is controlled by operating registers corresponding to these plugs.

FIGS. 7A to 7D are diagrams showing configurations of the oMPR, oPCR, iMPR and iPCR. FIG. 7A shows a configuration of the oMPR. FIG. 7B shows a configuration of the oPCR. FIG. 7C shows a configuration of the iMPR. FIG. 7D shows a configuration of the iPCR. In a 2-bit "data rate capability" of the MSB side of each of the oMPR and iMPR, there is stored a code indicating a maximum transmission rate of isochronous data which can be transmitted or received by the device. A broadcast channel base of the oMPR prescribes the number of a channel to be used for broadcast output.

In a 5-bit "number of output plugs" of the LSB side of the oMPR, there is stored the number of output plugs the device has, i.e., a value indicating the number of oPCRs. In a 5-bit "number of input plugs" of the LSB side of the iMPR, there is stored the number of input plugs the device has, i.e., a value indicating the number of iPCRs. A non-persistent extension field and a persistent extension field are areas defined for future extension.

An "on-line" of an MSB of each of the oPCRs and iPCRs indicates the usage state of the plug. In other words, the on-line value having "1" indicates that the plug is on-line and the on-line value having "0" indicates that the plug is off-line. A value of a "broadcast connection counter" of each of oPCRs and iPCRs indicates whether there is broadcast connection (1) or not (0). A value of a "point-to-point connection counter" having a 6-bit width in each of oPCRs and iPCRs represents the number of point-to-point connections the plug has.

A value of a "channel number" having a 6-bit width in each of oPCRs and iPCRs represents the number of isochronous channel to which the plug is connected. A value of a "data rate" having a 2-bit width in each of oPCRs indicates the actual transmission rate of a packet of isochronous data outputted from that plug. A code stored in an "overhead ID" having a 4-bit width in each of oPCRs indicates the bandwidth of the overhead of the isochronous communication. A value of a "payload" having a 10-bit width in each of oPCRs indicates a maximum value of data contained in an isochronous packet the plug can handle.

Figure 8:
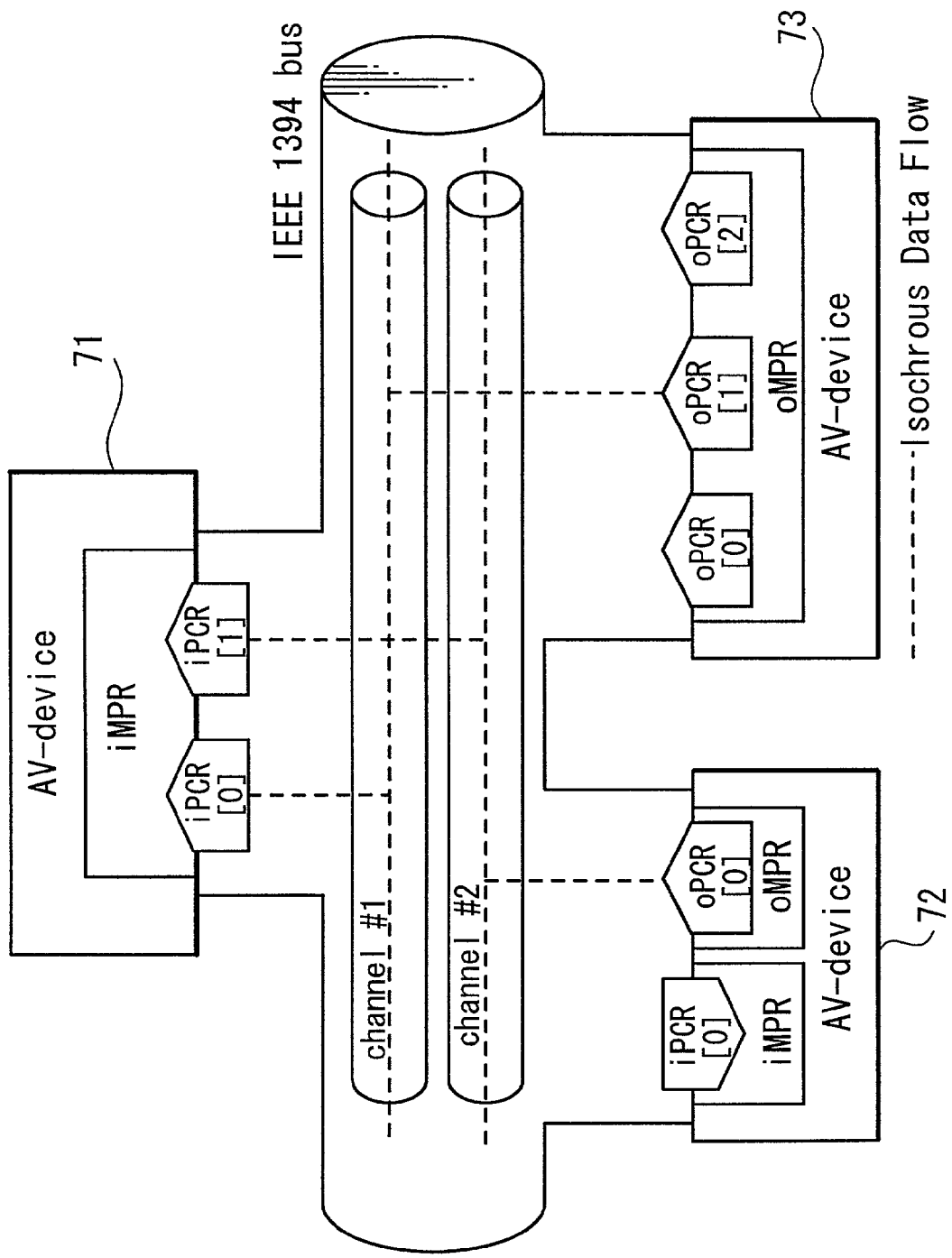
FIG. 8 is a diagram showing an example of relations among plugs, plug control registers, and transmission channels.

FIG. 8 is a diagram showing relations among plugs, plug control registers, and isochronous channels. AV devices 71 to 73 are connected by an IEEE 1394 serial bus. Isochronous data specified in a channel by an oPCR [1] among oPCR [0] to oPCR [2] prescribed in transmission rate and the number of oPCRs by an oMPR of the AV device 73 is sent out to a channel #1 of the IEEE 1394 serial bus. Between iPCR [0] and iPCR [1] prescribed in transmission rate and the number of iPCRs by an iMPR of the AV device 71, the iPCR [0] specifies the input channel #1. The AV device 71 reads isochronous data sent out on the channel #1 of the IEEE 1394 serial bus. In the same way, the AV device 72 sends out isochronous data onto the channel #2 specified by the oPCR [0]. The AV device 71 reads isochronous data from the channel #2 specified by the iPCR [1].

In this way, data transmission is conducted between devices connected by the IEEE 1394 serial bus. In the system of the present example, however, control and state decision of respective devices can be conducted by utilizing an AV/C command set prescribed as commands for controlling devices connected via the IEEE 1394 serial bus. The AV/C command set will now be described.

Figure 9:
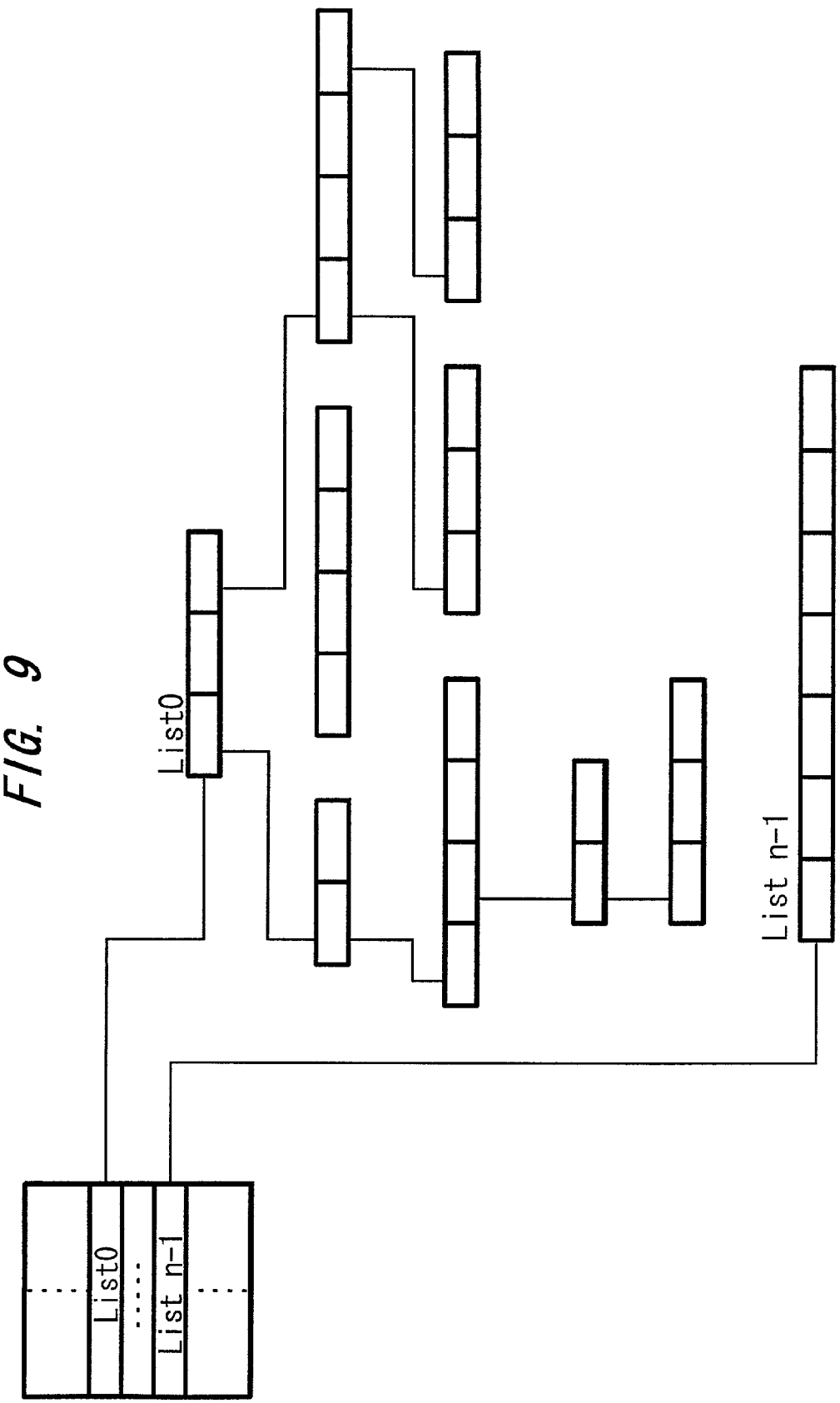
FIG. 9 is a diagram showing an example of a data structure using a hierarchical structure of a descriptor.

First of all, a data structure of a subunit identifier descriptor in the AV/C command set used in the system of the present example will now be described by referring to FIGS. 9 to 12. FIG. 9 shows the data structure of the subunit identifier descriptor. As shown in FIG. 9, the subunit identifier descriptor is formed of lists each having a hierarchical structure. In the case of a tuner, the lists represent channels which can be received. In the case of a disc, the lists represent songs recorded thereon. A list of the highest layer of a hierarchical structure is called a root list. For example, list 0 becomes the root for its subordinate lists. In the same way, lists 2 to (n-1) become root lists. There are as many root lists as objects. For example, in the case where AV devices are tuners, objects are channels in digital broadcast. Furthermore, all lists of one hierarchical class share common information.

FIG. 10 shows a format of the general subunit identifier descriptor used in a conventional system. In the general subunit identifier descriptor 41, attribute information concerning the function is described in its contents. A "descriptor length field" does not contain the value of its field itself. A "generation ID" indicates the version of the AV/C command set. Its value is currently "00h" (where h represents hexadecimal notation) as shown in FIG. 2. Here, "00h" means that the data structure and command conform to version 3.0 of the AV/C General Specification. Furthermore, as shown in FIG. 11, all values except "00h" are reserved and secured for future specifications.

A "size of list ID" indicates the number of bytes of a list ID. A "size of object ID" indicates the number of bytes of an object ID. A "size of object position" indicates the position (the number of bytes) in a list to be used for reference at the time of control. A "number of root object lists" indicates the number of root object lists. A "root object list id" indicates an ID for identifying a root object list of the highest rank of each of independent hierarchical classes.

A "subunit dependent length" indicates the number of bytes of a subsequent "subunit dependent information" field. The "subunit dependent information" field is a field indicating information peculiar to the function. A "manufacturer dependent length" indicates the number of bytes of a subsequent "manufacturer dependent information" field. The "manufacturer dependent information" field is a field indicating specification information of a vendor (manufacturer). If the descriptor does not contain "manufacturer dependent information", the "manufacturer dependent information" field is not present.

FIG. 12 indicates the assignment range of list IDs shown in FIG. 10. As shown in FIG. 12, "0000h to 0FFFh" and "4000h to FFFFh" are reserved and secured as assignment ranges for future specifications. In order to identify dependent information of the function type, "1000h to 3FFFh" and "10000h to maximum list ID value" are prepared.

Figure 13:
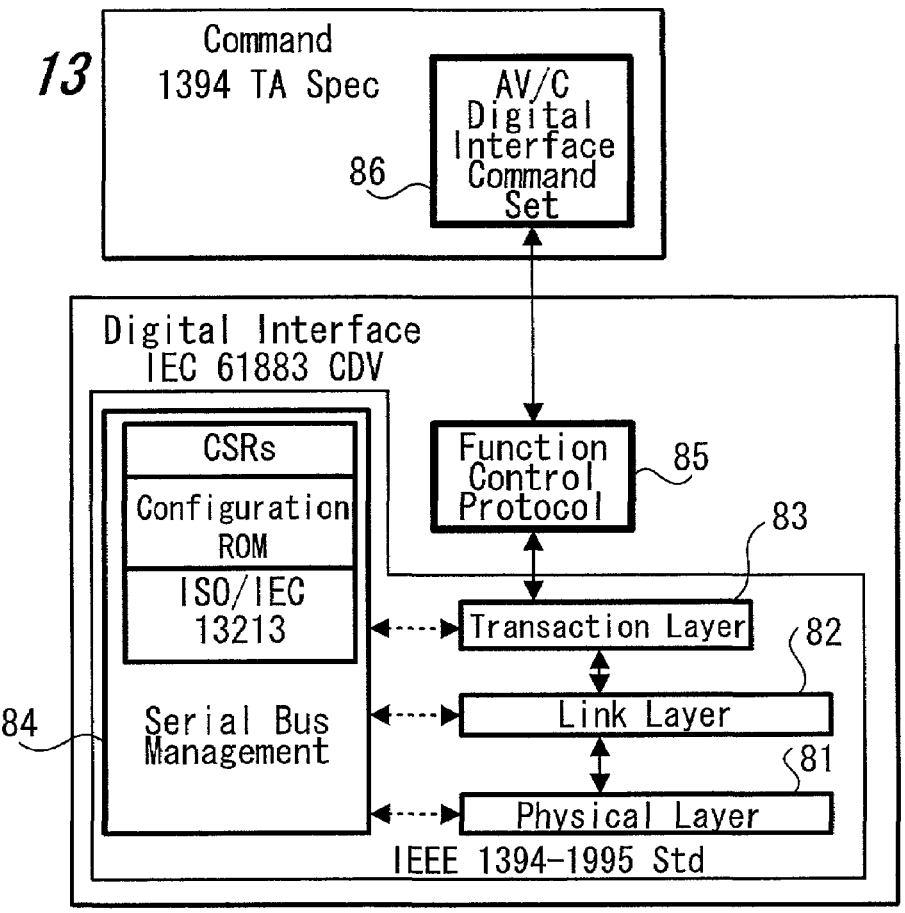
FIG. 13 is a diagram showing an example of a stack model of an AV/C command.

By referring to FIGS. 13 to 18, the AV/C command set used in the system of the present example will now be described. FIG. 13 shows a stack model of the AV/C command set. As shown in FIG. 13, a physical layer 81, a link layer 82, a transaction layer 83, and a serial bus management 84 conform to the IEEE 1394. A FCP (Function Control Protocol) 85 conforms to IEC 61883. An AV/C command set 86 conforms to 1394 TA specifications.

Figure 14:
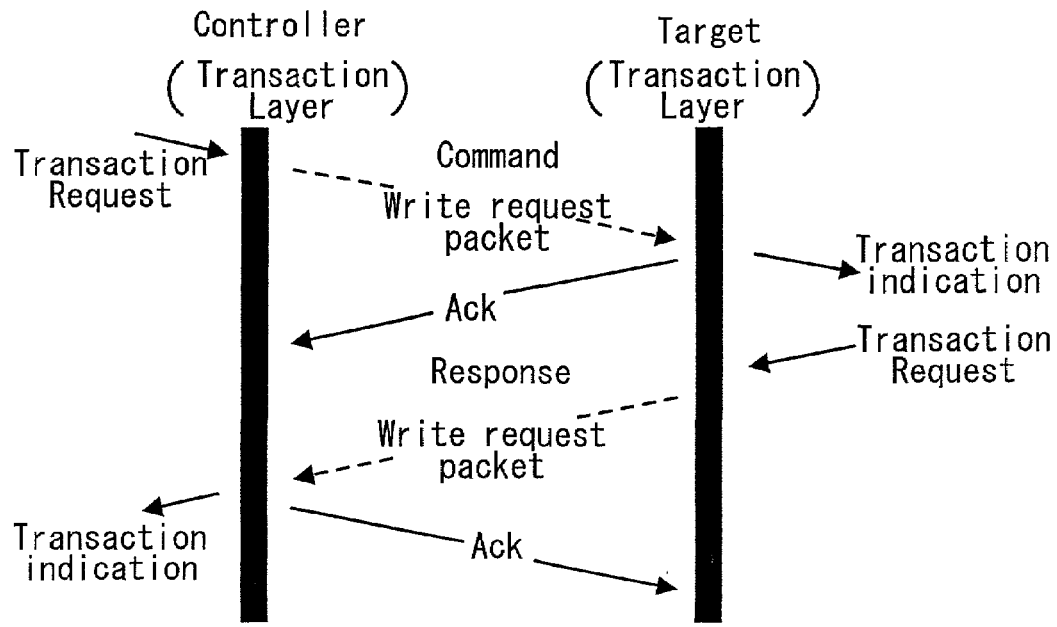
FIG. 14 is a diagram showing a relation between a command and a response of FCP.

FIG. 14 is a diagram describing a command and a response of the FCP 85 shown in FIG. 13. The FCP is a protocol for effecting control of AV devices on the IEEE 1394 scheme. As shown in FIG. 14, the controlling side is a controller and the controlled side is a target. Command transmission and response of the FCP are conducted between nodes by using write transaction of asynchronous communication of the IEEE 1394. Upon receiving data, the target returns an acknowledgement to the controller for acknowledging the reception.

Figure 15:
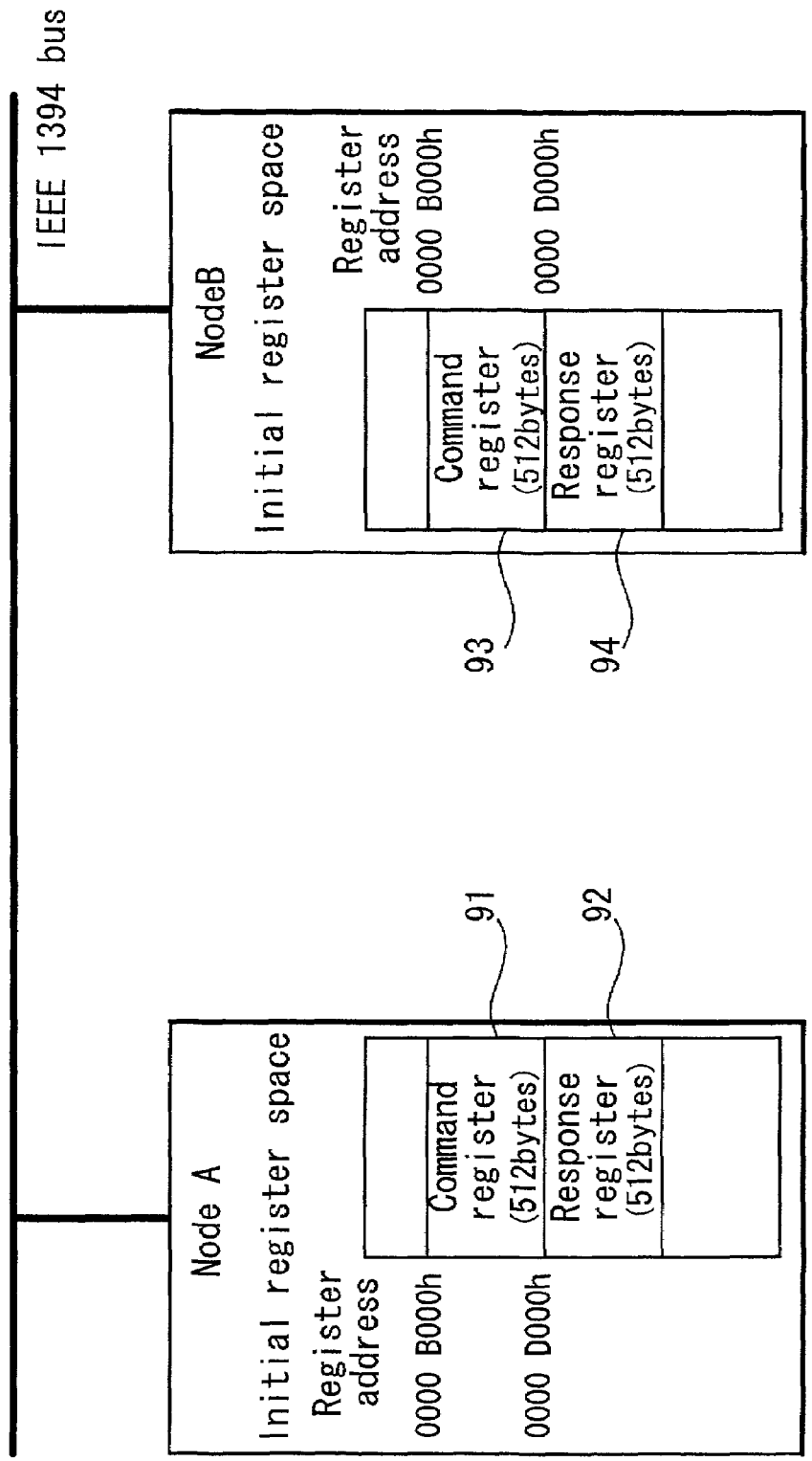
FIG. 15 is a diagram showing the relation between the command and the response of FIG. 14 in more detail.

FIG. 15 is a diagram showing the relation between the command and response of the FCP of FIG. 14 in more detail. A node A and a node B are connected via an IEEE 1394 bus. The node A is the controller, and the node B is the target. In both the node A and the node B, a command register and a response register each having 512 bytes are prepared. As shown in FIG. 15, the controller conveys an instruction by writing a command message into a command register 93 of the target. On the other hand, the target conveys a response by writing a response message into a response register 92 of the controller. For the two messages heretofore described, control information is exchanged. The kind of a command set sent by the FCP is described in a CTS included in a data field shown in FIG. 16 and described later.

Figure 16:
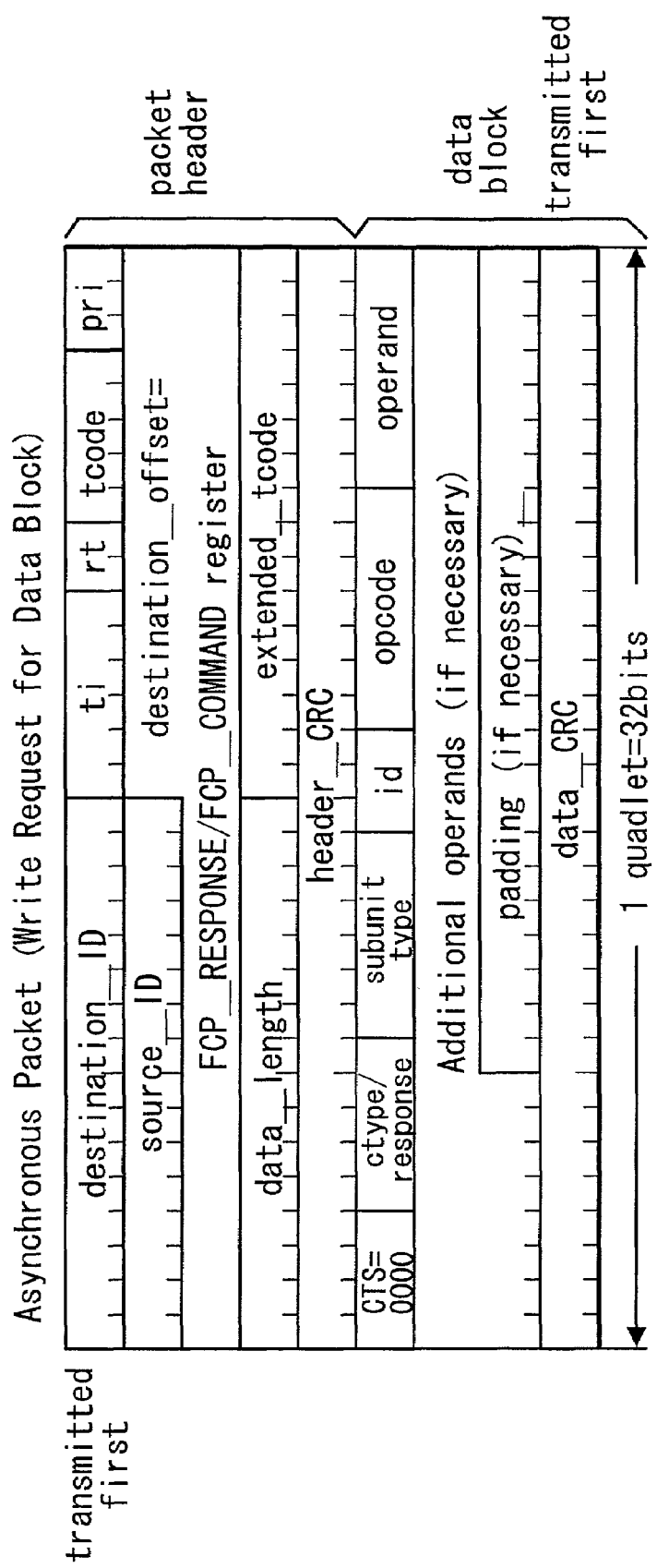
FIG. 16 is a diagram showing an example of a data structure of an AV/C command.

FIG. 16 shows a data structure of a packet transmitted in an asynchronous transfer mode of the AV/C command. The AV/C command set is a command set for controlling an AV device, and its CTS (ID of command set)="0000". AV/C command frames and response frames are exchanged between the nodes by using the above described FCP. In order to prevent casting a burden upon the bus and the AV device, a response to a command is defined to be sent within 100 ms. As shown in FIG. 16, data of an asynchronous packet has 32 bits (=1 quadlet) in the horizontal direction. Upper columns of FIG. 16 show a header portion of the packet, and lower columns of FIG. 16 show a data block. A destination ID indicates the destination.

The CTS indicates an ID of the command set. In the AV/C command set, CTS="0000". A ctype/response field indicates a function class of a command when the packet is a command, and a processing result of a command when the packet is a response. Commands are broadly divided into four kinds of definition: (1) commands (CONTROL) for controlling the function from the outside; (2) commands (STATUS) for inquiring about the state from the outside; (3) commands for inquiring whether support of a control command is present, from the outside (GENERAL INQUIRY (whether support of an opcode is present) and SPECIFIC INQUIRY (whether supports of an opcode and operands are present)); and (4) commands (NOTIFY) for requesting the notice of a state change to the outside.

A response is returned according to the command kind. As responses to the CONTROL commands, there are "NOT IMPLEMENTED", "ACCEPTED", "REJECTED" and "INTERIM". As responses to the STATUS commands, there are "NOT IMPLEMENTED", "REJECTED", "IN TRANSITION", and "STABLE". As responses to the "GENERAL INQUIRY" and "SPECIFIC INQUIRY" commands, there are "IMPLEMENTED" and "NOT IMPLEMENTED". As responses to the "NOTIFY" command, there are "NOT IMPLEMENTED", "REJECTED", "INTERIM", and "CHANGED".

A "subunit type" is provided to specify a function in the device. For example, "tape recorder/player", "tuner", or the like is assigned. In order to distinguish subunits in the case where there are a plurality of subunits of the same kind, addressing is conducted by using a subunit ID as a distinguishing number. An "opcode" represents a command. An "operand" represents a parameter of the command. "Additional operands" are fields added as occasion demands. "Padding" is also a field added as occasion demands. "Data CRC (Cyclic Redundancy Check)" is used for error check at the time of data transmission.

FIGS. 17A to 17C show concrete examples of the AV/C command. FIG. 17A shows concrete examples of ctype/response. Its upper column shows commands and its lower column shows responses. "CONTROL" is assigned to "0000". "STATUS" is assigned to "0001". "SPECIFIC INQUIRY" is assigned to "0010". "NOTIFY" is assigned to "0011". "GENERAL INQUIRY" is assigned to "0100". "0101 to 0111" are reserved and secured for future specifications. "NOT IMPLEMENTED" is assigned to "1000". "ACCEPTED" is assigned to "1001". "REJECTED" is assigned to "1010". "IN TRANSITION" is assigned to "1011". "IMPLEMENTED/STABLE" is assigned to "1100". "CHANGED" is assigned to "1101". "INTERIM" is assigned to "1111". "1110" is reserved and secured for future specifications.

FIG. 17B shows concrete examples of the subunit type. "Video monitor" is assigned to "00000". "Disc recorder/player" is assigned to "00011". "Tape recorder/player" is assigned to "00100". "Tuner" is assigned to "00101". "Video camera" is assigned to "00111". "Vender unique" is assigned to "11100". "Subunit type extended to next byte" is assigned to "11110". "Unit" is assigned to "11111", and it is used when the command or response is sent to the device itself. For example, turning on and off of the power supply can be mentioned.

FIG. 17C shows concrete examples of opcodes. For each of the subunit types, a table of opcodes exists. In FIG. 17C, opcodes in the case where the subunit type is the "tape recorder/player" are shown. Furthermore, for each opcode, an operand is defined. Here, "VENDOR-DEPENDENT" is assigned to "00h". "SEARCH MODE" is assigned to "50h". "TIMECODE" is assigned to "51h". "ATN" is assigned to "52h". "OPEN MIC" is assigned to "60h". "READ MIC" is assigned to "61h". "WRITE MIC" is assigned to "62h". "LOAD MEDIUM" is assigned to "C1h". "RECORD" is assigned to "C2h". "PLAY" is assigned to "C3h". "WIND" is assigned to "C4h".

FIGS. 18A and 18B show concrete examples of an AV/C command and an AV/C response. For example, in the case where a playback order is to be given to a playback device serving as the target (consumer), the controller sends the command to the target as shown in FIG. 18A. In this command, CTS="0000" because the AV/C command set is used. Since the command (CONTROL) for controlling a device from the outside is used, ctype="0000" (see FIG. 17A). Since the subunit type is a tape recorder/player, it follows that subunit type="00100" (see FIG. 17B). Furthermore, "id" indicates the case of ID0, and id= 000. The opcode becomes "C3h" meaning the playback (see FIG. 17C). The operand becomes "75h" meaning "FORWARD". Upon playback, the target returns a response as shown in FIG. 18B to the controller. Since "accepted" is included in the response, it follows that response="1001" (see FIG. 17A). Except the response, other fields are the same as those of FIG. 18A, and description thereof will be omitted.

[IEEE 1394 device]

Figure 19:
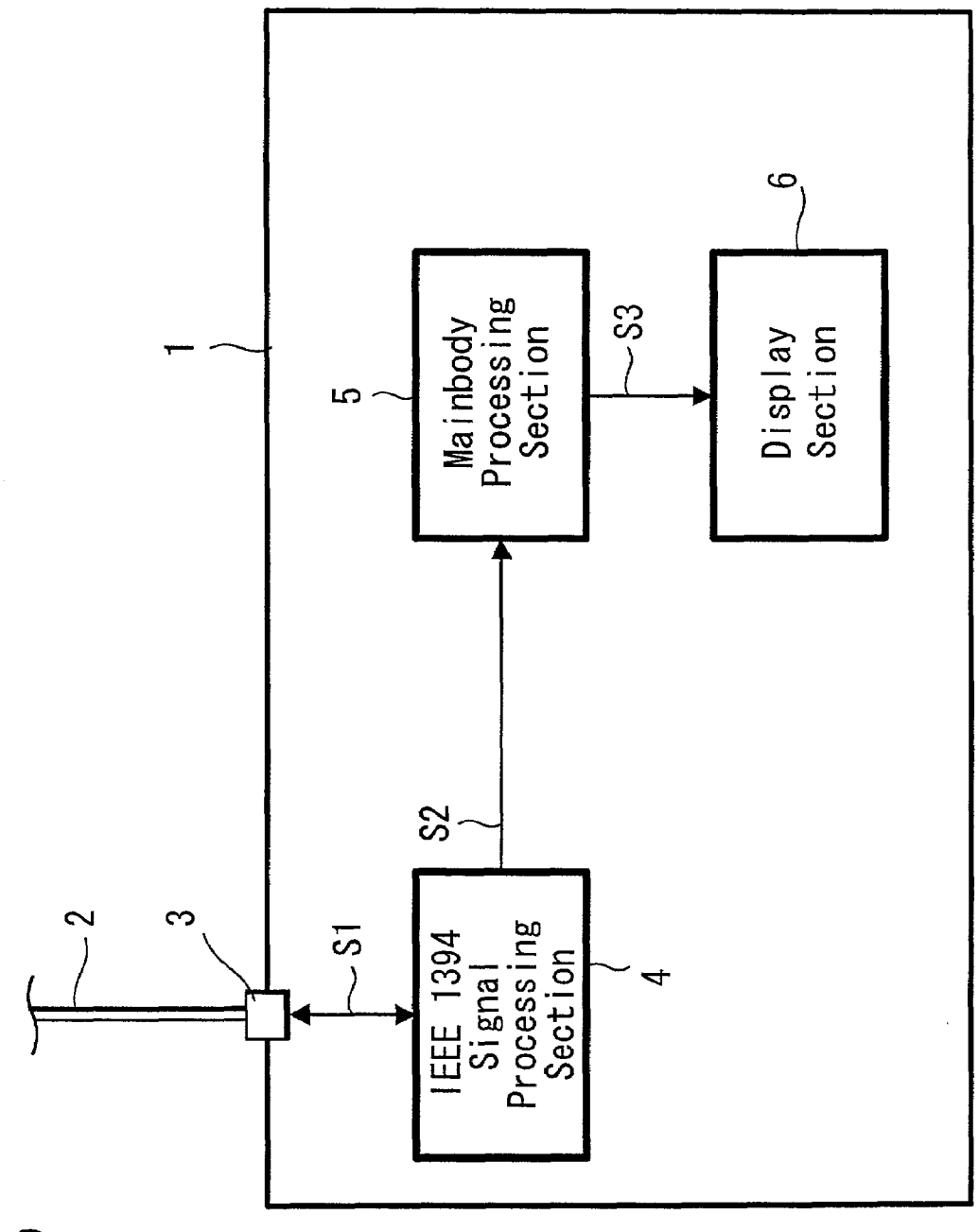
FIG. 19 is a block diagram showing a configuration of an IEEE 1394 device to which an embodiment of the present invention is applied.

FIG. 19 is a block diagram showing a configuration of an IEEE 1394 device, to which the present embodiment is applied.

In FIG. 19, an IEEE 1394 device 1 is connected to an IEEE 1394 cable 2, which forms a network, via an IEEE 1394 connector 3. The IEEE 1394 device 1 includes therein an IEEE 1394 signal processing section 4 for transmitting or receiving an IEEE 1394 signal S1 to or from the IEEE 1394 cable 2, a main body processing section 5 for conducting processing on error information S2 supplied from the IEEE 1394 signal processing section 4, and an display section 6 for displaying error display data S3 supplied from the main body processing section 5.

Figure 26:
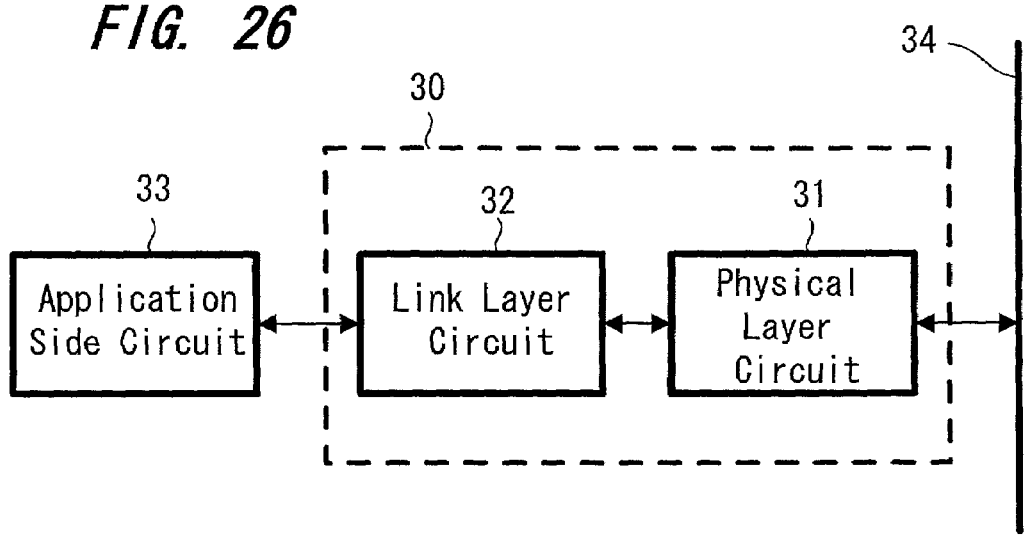
FIG. 26 is a diagram showing an IEEE 1394 serial interface circuit.

The IEEE 1394 signal processing section 4 includes a physical layer circuit 31 and a link layer circuit 32 as represented by a signal processing circuit 30 connected to an IEEE 1394 serial bus 34 shown in an IEEE 1394 serial interface of FIG. 26.

The IEEE 1394 signal processing section 4 conducts detection of error information concerning connection of isochronous transmission, detection of error information concerning isochronous packets such as audio data, detection of bus reset of relatively low order concerning the IEEE 1394 , loop connection detection, and detection of error information S2 such as channel or band deficiency of relatively middle order.

By monitoring the IEEE 1394 signal S1 supplied from the IEEE 1394 cable 2, the IEEE 1394 signal processing section 4 conducts loop detection, and detection of error information S2 of relatively low order, such as cable pulling out or putting in.

By monitoring header information of packets, the IEEE 1394 signal processing section 4 detects error information S2 of relatively middle order, such as indistinguishable video data from audio data or a format error due to insufficient interval for real time transmission.

By letting video data and audio data flow on the bus, conducting negotiation, and monitoring the flowing signals, the IEEE 1394 signal processing section 4 detects error information S2 of relatively middle order, such as noise detection, irregular signal detection, or detection deviation of a synchronizing signal which should come within a fixed time. At this time, the IEEE 1394 signal processing section 4 detects the error information S2, while making a distinction between an error of the receiving system on the network and an error within a device.

The main body processing section 5 includes a CPU, a ROM, and a RAM. The main body processing section 5 supplies display data S3 displaying an abnormal state which is high in emergency for the user and which induces an error avoiding action, among some kinds of error information S2 supplied from the IEEE 1394 signal processing section 4, to the display section 6.

By detecting the error information S2 and judging the degree of emergency, the main body processing section 5 judges the order of error display.

Furthermore, by conducting protocol control and judging the error information S2, the main body processing section 5 supplies display data S3 displaying such a band error of relatively middle order that represents a band which cannot be let flow on the bus, to the display section 6.

Furthermore, by, for example, judging the error information S2 on the basis of the degree of emergency, the main body processing section 5 supplies display data S3 displaying a connection device error which is absence of a required connection device, such as absence of a configuration for receiving a video signal, absence of a configuration for receiving a cryptograph, or a trouble of the receiving side.

The display section 6 displays received display data in a suitable display method. For example, the display data is displayed by flashing characters twice in a short time interval, and display is conducted for one second. Furthermore, an error is displayed by characters in an alarm display column by utilizing a GUI (Graphical User Interface), or an icon for alarm is displayed. At this time, as soon as an error is detected, application software for the GUI, which is high order, can be started and the error can be displayed.

As described later, the display section 6 also displays user's measure corresponding to an error display.

The IEEE 1394 device having the above described configuration conducts operation hereafter described.

Figure 20:
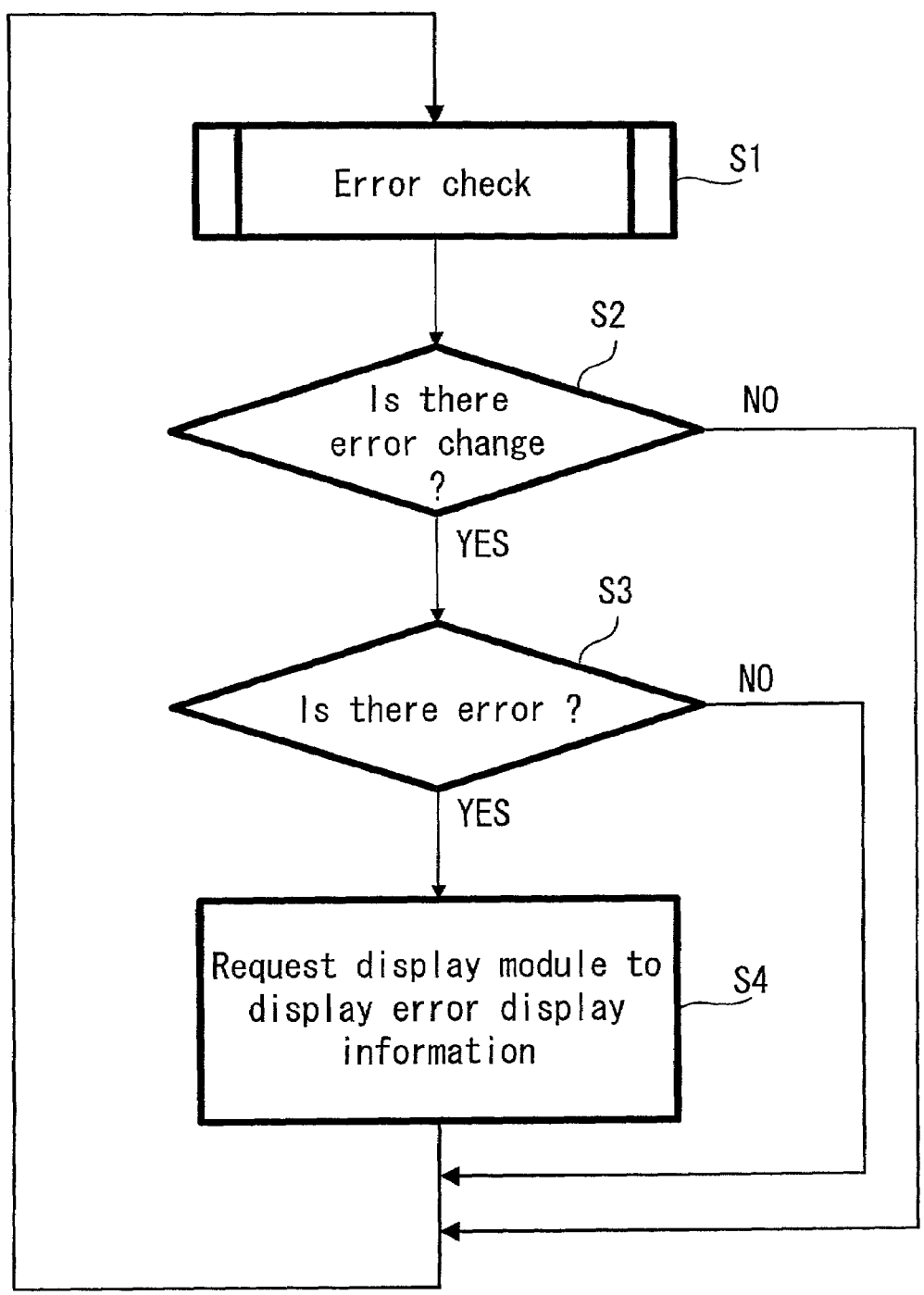
FIG. 20 is a flow chart showing main operation of an error check.

FIG. 20 is a flow chart showing main operation of an error check.

In FIG. 20, the error check is conducted at a step S1. To be concrete, operation of a flow chart shown in FIG. 21 described later is conducted.

At a step S2, it is determined whether there is a change in the error. To be concrete, it is determined whether the error has disappeared.

When there is a change in the error at the step S2, the processing proceeds to a step S3 and it is determined whether there is an error. To be concrete, in such a state that the error has already been detected, it is determined whether another error is detected. When an change of error information is detected, an display priority order of the error information is judged.

When there is an error at the step S3, the processing proceeds to a step S4 and a request is issued to display error display information on an display module. To be concrete, if error information is detected, then the error is displayed according to an display priority order of the error information. Even if some error information pieces are detected simultaneously, therefore, only one of them is displayed as an error in order to prevent the user from being confused. If error information having a high display priority order is detected even in the case an error has already been displayed, the error display which is currently displayed is interrupted and the error information having the high display priority order is displayed. Therefore, a user's measure can be displayed intelligibly while making a distinction between an error of the receiving system on the network and an error within a device. As for the concrete priority order, the low order is an error caused by bus reset, the middle order is an error without connection such as band, and the high order is an error with connection such as protocol. In this case, the lower order error is judged from information of a configuration register, and the medium and high order errors are judged from packet information.

Figure 21:
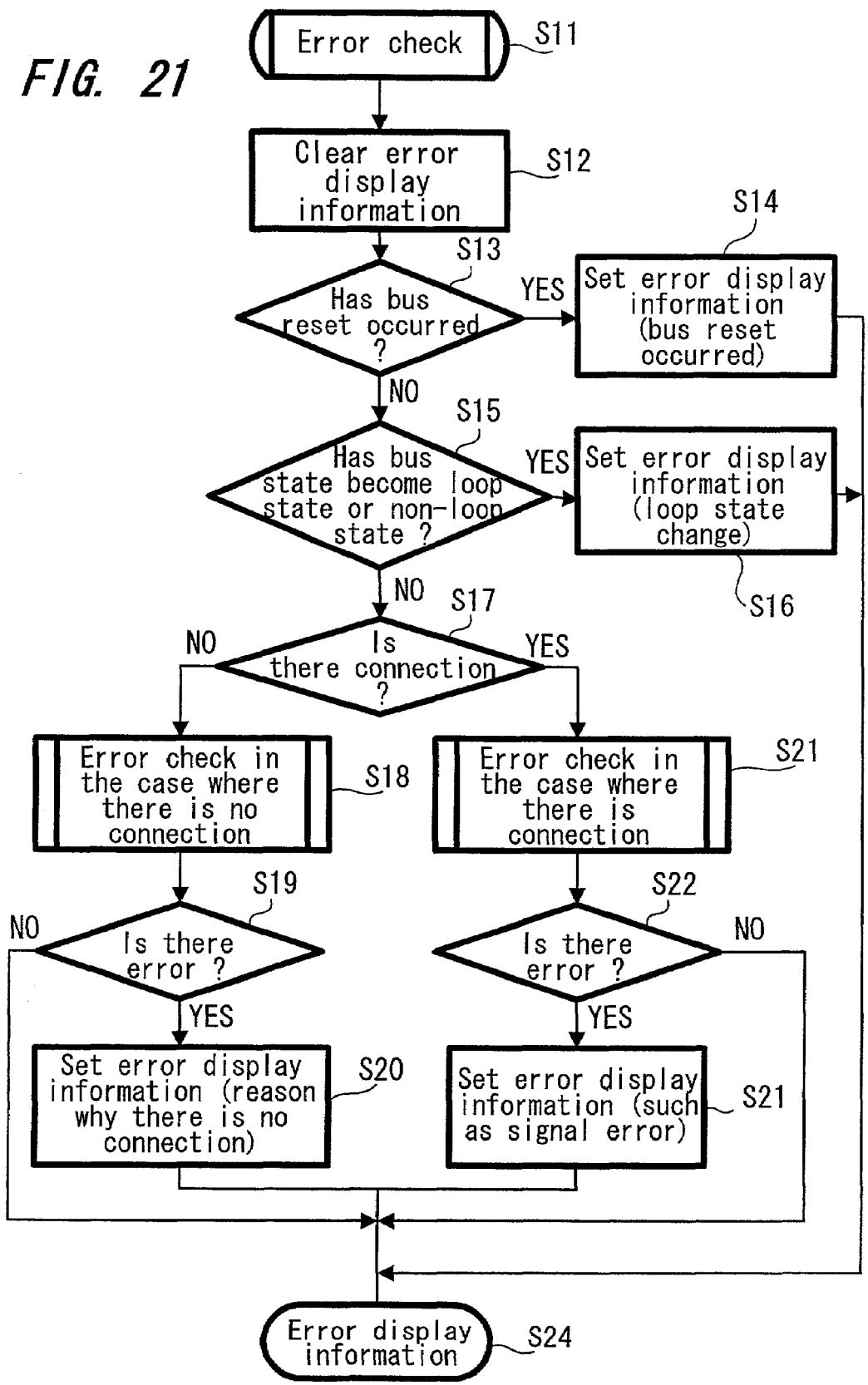
FIG. 21 is a flow chart showing detailed operation of the error check.

FIG. 21 is a flow chart showing detailed operation of the error check. The flow chart shown in FIG. 21 corresponds to the operation of the step S1 shown in FIG. 20.

In FIG. 21, the error check is started at a step S11.

At a step S12, error display information is cleared.

At a step S13, it is determined whether bus reset has occurred. If bus reset has occurred at the step S13, then the processing proceeds to a step S14 and error display information of bus reset occurrence is set.

If bus reset has not occurred at the step S13, then the processing proceeds to a step S15 and it is determined whether the bus state has become a loop state or whether the bus state has become a non-loop state.

If the bus state has become a loop state or the bus has become a non-loop state at the step S15, then the processing proceeds to a step S16 and error display information of the loop state change is set.

Unless the bus state has become a loop state or the bus state has become a non-loop state at the step S15, then the processing proceeds to a step S17 and it is determined whether there is connection.

If there is no connection at the step S17, then the processing proceeds to a step S18 and the error check in the case where there is no connection is conducted. To be concrete, operation of a flow chart shown in FIG. 22 described later is conducted.

At a step S19, it is determined whether there is an error. If there is an error at the step S19, then the processing proceeds to a step S20, and error display information with no connection is set.

If there is connection at the step S17, then the processing proceeds to a step S21 and the error check in the case where there is connection is conducted. To be concrete, operation of a flow chart shown in FIG. 23 described later is conducted.

At a step S22, it is determined whether there is an error. If there is an error at the step S22, the processing proceeds to a step S23 and error display information such as a signal error is set.

If the error display information of bus reset occurrence is set at the step S14, the error display information of the loop state change is set at the step S16, the error display information of no connection is set at the step S20, the error display information such as a signal error is set at the step S23, there is no error at the step S19, or there is no error at the step S22, then the processing proceeds to a step S24 and error display information is output.

To be concrete, if an display priority order is defined in the order of bus reset and loop connection, and the error information is detected, then error display information is output so as to display the error with the top priority than other errors. Even while other error information is being displayed, therefore, the display is interrupted and error information having a higher display priority order is displayed.

Figure 22:
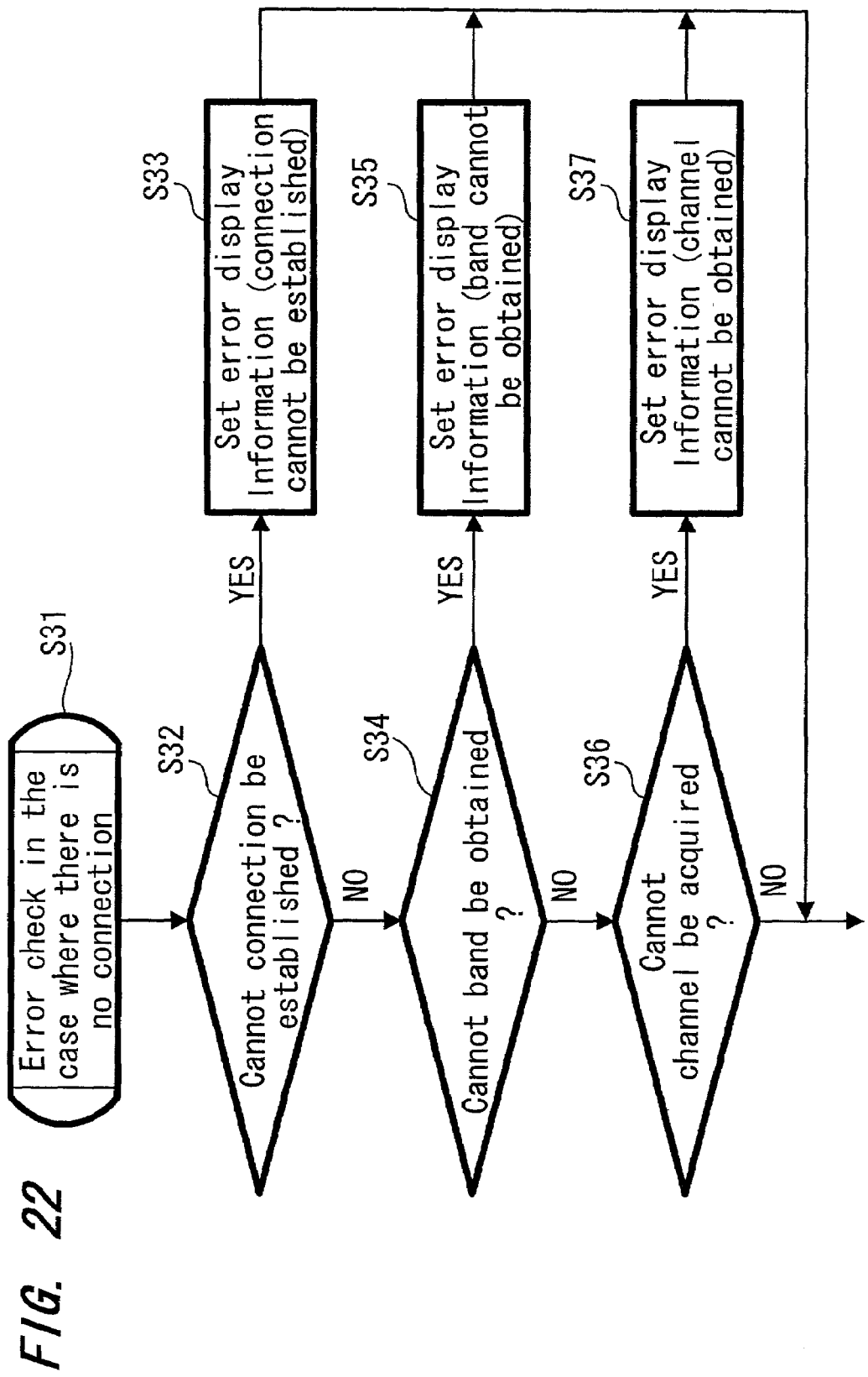
FIG. 22 is a flow chart showing operation of the error check in the case where there is no connection.

FIG. 22 is a flow chart showing operation of the error check in the case where there is no connection. The flow chart shown in FIG. 22 corresponds to operation of the step S18 shown in FIG. 21.

In FIG. 22, the error check in the case where there is no connection is started at a step S31.

At a step S32, it is determined whether connection cannot be formed.

If connection cannot be established at the step S32, the processing proceeds to a step S33 and error display information to the effect that connection cannot be established is set.

If connection can be established at the step S32, then the processing proceeds to a step S34 and it is determined whether a band cannot be obtained.

If the band cannot be obtained at the step S34, then the processing proceeds to a step S35 and error display information to the effect that the band cannot be obtained is set.

If the band can be obtained at the step S34, then the processing proceeds to a step S36 and it is determined whether a channel cannot be acquired. If the channel cannot be acquired at the step S36, then the processing proceeds to a step S37 and error display information to the effect that the channel cannot be acquired is set.

As described above, as for error information concerning connection of isochronous transmission which has occurred during the connection processing of isochronous transmission, error causes, such as such a state that connection cannot be established, such a state that a band cannot be obtained, and such a state that a channel cannot be acquired, are extracted successively from the error information according to a procedure of connection processing, and error display is conducted.

Figure 23:
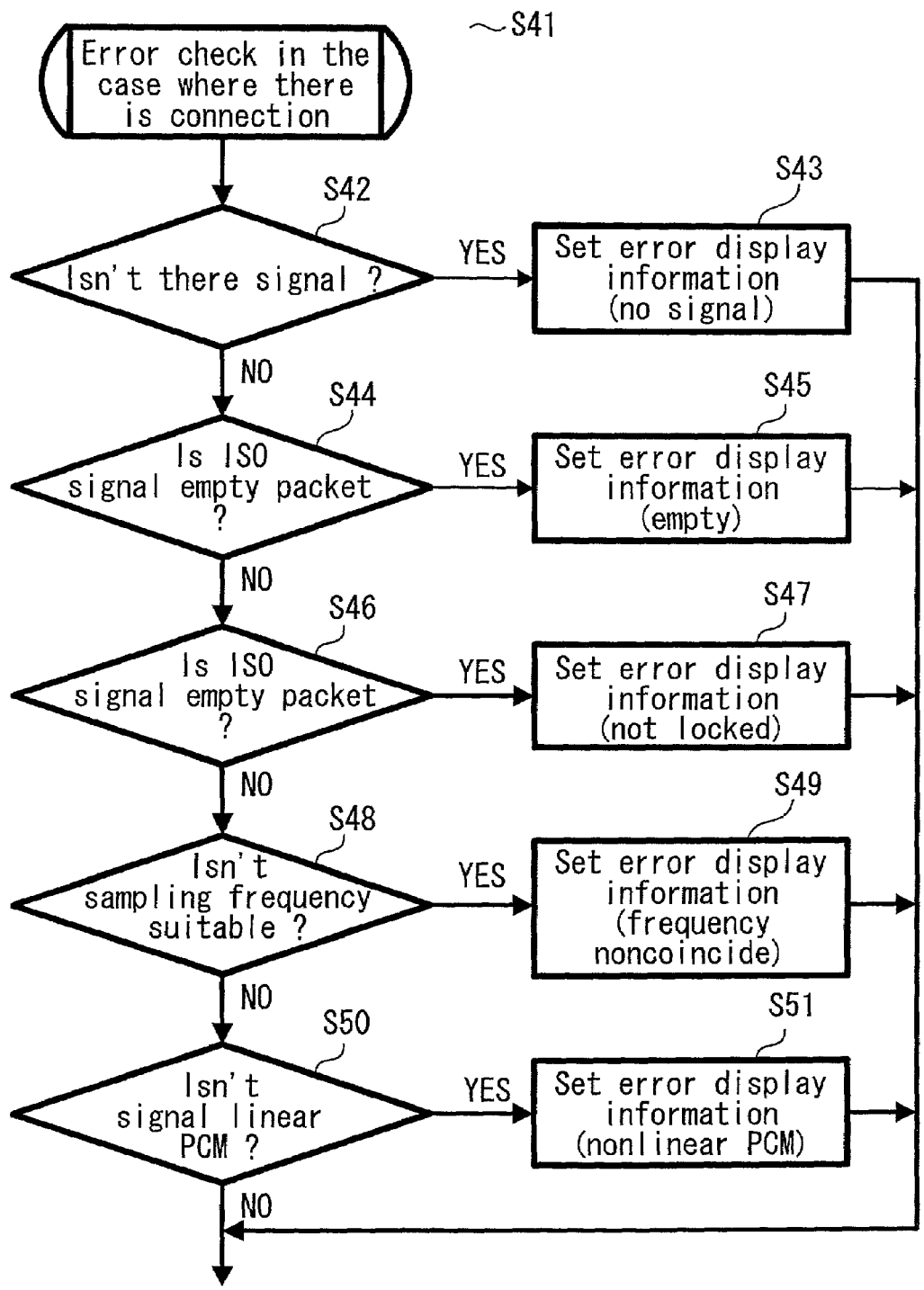
FIG. 23 is a flow chart showing operation of the error check in the case where there is connection.

FIG. 23 is a flow chart showing operation of the error check in the case where there is connection. The flow chart shown in FIG. 23 corresponds to operation of the step S21 shown in FIG. 21.

In FIG. 23, the error check in the case where there is connection is started at a step S41.

At a step S42, it is determined whether there is no signal.

If there is no signal at the step S42, then the processing proceeds to a step S43 and error display information to the effect that there is no signal is set.

If there is a signal at the step S42, then the processing proceeds to step a S44 and it is determined whether an ISO (isochronous) signal is an empty packet.

If the ISO (isochronous) signal is the empty packet at the step S44, then the processing proceeds to a step S45 and error display information to the effect that the packet is empty is set.

If the ISO (isochronous) signal is not the empty packet at the step S44, then the processing proceeds to a step S46 and it is determined whether a signal is not PLL (Phase Locked Loop) locked. If the signal is not PLL locked at the step S46, then the processing proceeds to a step S47 and error display information to the effect that the signal is not locked is set.

If the signal is PLL locked at the step S46, then the processing proceeds to a step S48 and it is determined whether a sampling frequency is not suitable. If the sampling frequency is not suitable at the step S48, then the processing proceeds to a step S49 and error display information to the effect that the frequency is not suitable is set.

If the sampling frequency is suitable at the step S48, then the processing proceeds to a step S50 and it is determined whether a signal is not a linear PCM (Pulse Code Modulation) signal. If the signal is not the linear PCM signal at the step S50, then error display information of nonlinear PCM is set.

As described above, as for error information concerning data of isochronous transmission which has occurred after completing connection processing of isochronous transmission, the display priority order is defined in the order of such a state that there is no signal, such a state that there is no audio data in an isochronous packet, such a state that there is no synchronizing information or synchronizing information is wrong, such a state that a audio sampling frequency is not corresponding, and such a state that audio data is not a linear PCM.

In this way, error information may be displayed by successively changing time from high order to low order. Furthermore, as for processing in the case where an error of low order and an error of high order overlap, an error caused by bus reset which is an error of low order may be displayed together with an error of high order without connection or with connection. It is also possible to interrupt error display of low order and display an error of high order over an error of low order. Furthermore, upon recovery from an error of low order, it may not be displayed at the time of display of high order.

FIG. 24 is a diagram showing error messages.

In FIG. 24, a display message 62 corresponding to "C78:11" (at the time of device selection) in an error code number 61 is "The selected device is conducting 63 LINCs (links) and it cannot cope with more LINCs". The detail is (12) "Connection failure of an output plug of the opposite device side". A display message 62 corresponding to "C78:12" (TUNER, ANALOG) in the error code number 61 is "STR (stereo tuner receiver) has 63 formed LINCs (links) and it cannot have more links". The detail is (31) "Connection failure of its own input plug".

A display message 62 corresponding to "C78:22.22" in the error code number 61 is "The case where a different format (a signal which cannot be reproduced) is detected". The detail is (22) "The format is not an IEC 958 format". A display message 62 corresponding to "C78:22.23" in the error code number 61 is "The case where a different format (a signal which cannot be reproduced) is detected". The detail is (23) "Discrepancy between N bits (asynchronous) and a rate control protocol". A display message 62 corresponding to "C78:22.25" in the error code number 61 is "The case where a different format (a signal which cannot be reproduced) is detected". The detail is (25) "The sampling frequency is not suitable". A display message 62 corresponding to "C78:22.26" in the error code number 61 is "The case where a different format (a signal which cannot be reproduced) is detected". The detail is (26) "The signal is not a linear PCM".

A display message 62 corresponding to "C78:31" in the error code number 61 is "The case where the signal clock is out of standard values and the PLL lock is not established". The detail is (24) "The signal is unlocked".

A display message 62 corresponding to "C78:04" in the error code number 61 is "The case where there are not input signals at all during selection of a connection device". The detail is (21) "There are no signals".

A display message 62 corresponding to "C78:15.13" in the error code number 61 is "Since the bus is full of signals, output or input cannot be conducted". The detail is (13) "band is deficient at the time of input". A display message 62 corresponding to "C78:15.14" in the error code number 61 is "Since the bus is full of signals, output or input cannot be conducted". The detail is (14) "Channel is fully occupied at the time of input". A display message 62 corresponding to "C78:15.15" in the error code number 61 is "since the bus is full of signals, output or input cannot be conducted". The detail is (15) "Band is deficient at the time of output". A display message 62 corresponding to "C78:15.33" in the error code number 61 is "Since the bus is full of signals, output or input cannot be conducted". The detail is (33) "Channel is fully occupied at the time of output".

A display message 62 corresponding to "C78:03" in the error code number 61 is "A loop has been formed by cable connection".

A display message 62 corresponding to "C78:00" in the error code number 61 is "Bus reset has occurred (for example, in the case where a new device is connected)".

Error messages heretofore described correspond to errors of transmission processing of the receiving system on the network. Not only those but also error messages corresponding to errors within the device hereafter described are displayed.

A display message 62 corresponding to "C60:01" in the error code number 61 is "The temperature within the device is rising". A display message 62 corresponding to "C60:08" in the error code number 61 is "The speaker terminal is short-circuited". A display message 62 corresponding to "C60:13" in the error code number 61 is "The selected device is not connected". As a result, it is possible to display a user's measure intelligibly while making a distinction between an error of the receiving system on the network and an error within a device.

FIG. 25 is a diagram showing an error message and a display corresponding to the user's measure. In FIG. 25, the above described case where a display message 62 corresponding to "C78:03" in the error code number 61 shown in FIG. 24 is displayed is shown as an example. Although not illustrated, the user's measure for each of other display messages is also displayed in the same display form.

With reference to FIG. 25, a message 12 representing "There is a loop in cable connection," a switch section 13 representing "Detail" for detailed display, and a switch section 14 representing "Re-inspection" are displayed on a display section 11 (liquid crystal touch panel) of an IEEE 1394 device 10. If the user depresses the switch section 13 representing "Detail," then a display 15 of the user's measure representing "The connection cannot be established in a loop state. Disconnect a cable in one place somewhere" is displayed instead of the message 12.

In this way, an error message can be displayed intelligibly on the liquid crystal display section. In addition, details can also be displayed. Furthermore, by also storing an error code which has occurred within the device in the storage section in the same way as the error code on the network, error codes corresponding to network errors and error codes corresponding to errors within the device can be processed by the same operation flow in the device decision block. In addition, priority order can be given easily.

[Loop Detection]

In the IEEE 1394 interface, data transfer is conducted by taking a packet as the unit. In the IEEE 1394 interface, the unit of minimum handled data is one quadlet (=4 bytes=32 bits).

The IEEE 1394 serial interface conducting such packet transmission and reception will now be described by referring to FIG. 26. A signal processing circuit 30 of the IEEE 1394 interface includes a physical layer circuit 31 for directly driving an IEEE 1394 serial bus 34, and a link layer circuit 32 for controlling data transfer of the physical layer circuit 31. The physical layer circuit 31 is connected to the IEEE 1394 serial bus 34 via a port. Furthermore, the link layer circuit 32 is connected to an application side circuit 33 such as an MPEG (Moving Picture Experts Group) transporter.

In the IEEE 1394 standards, a maximum of 63 signal processing circuits 30 can be connected via the serial interface bus 34. And the connection form of the serial interface bus 34 is stipulated so as to become a node branch form, i.e., the so-called tree form. A circuit serving as a branch point, i.e., a node of such a tree shaped connection form is the physical layer circuit 31 in the signal processing circuit 30. In the physical layer circuit 31, one or more ports can be provided according to the standards. The serial interface bus 34 is connected to the these ports.

Furthermore, according to the IEEE 1394 standards, the bus cable can be pulled out from and put in a port, in a hot state, i.e., in such a state that the power is turned on and each electronic device serving as each application side circuit 33 is operating. And at the time point when a node is added or deleted by pulling out from or putting in a port of the bus cable, bus reset is generated and the parent-child relation between nodes is determined.

Figure 27:
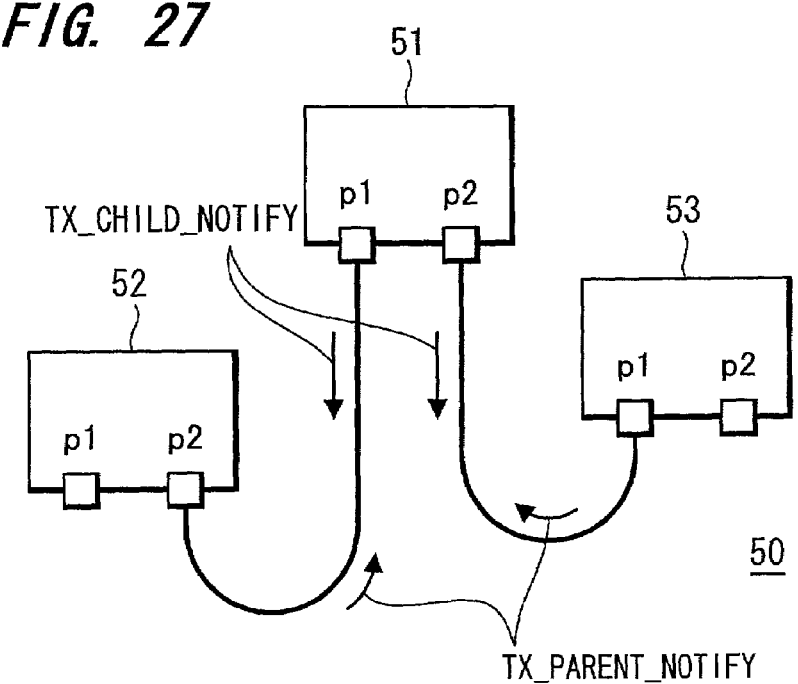
FIG. 27 is a diagram showing detection of loop connection.

An example of a system formed by connecting three nodes in a tree form by using the IEEE 1394 serial bus 34 cable is shown in FIG. 27. In FIG. 27, cables of the IEEE 1394 serial bus are represented by thick lines. This system 50 includes nodes 51, 52 and 53 serving as physical layer circuits which form signal processing of the IEEE 1394 serial interface. In each of the nodes 51, 52 and 53, two ports p1 and p2 are provided. Furthermore, each of the nodes 51, 52 and 53 includes a register which indicates the operation state of the node and registers which indicate the operation states of the ports. Here, a port p2 of the node 52 is connected to a port p1 of the node 51, and a port p1 of the node 53 is connected to a port p2 of the node 51.

In response to requests from the node 52 and the node 53, the node 51 recognizes that the node 52 and the node 53 are child nodes, and thereafter sends a signal "TX_CHILD_NOTIFY" to the node 52 and the node 53. As a result, such a connection relation that the node 51 is the parent and the node 52 and the node 53 are children is established. By the way, depending on timing of bus cable connection, the node 51 sends a request signal "TX_PARENT_NOTIFY" to the node 52 and the node 53, and the node 52 and the node 53 become parent nodes, in some cases.

However, it is now assumed that a port p1 of the node 52 and a port p2 of the node 53 are further connected together in the configuration shown in FIG. 27. In this case, each of the nodes 51, 52 and 53 sends the request signal "TX_PARENT_NOTIFY". As a result, parent-child relations cannot be established among the nodes 51, 52 and 53, and packets cannot be transmitted and received. If loop connection is thus conducted by using cables of the IEEE 1394 serial bus, then packets cannot be transmitted and received, and operation conforming to the IEEE 1394 standards cannot be conducted.

Such a loop state is detected from information of registers indicating the node operation state and registers indicating operation states of ports, which are provided in the nodes 51, 52 and 53.

[Configuration of an AV System]

Hereafter, there will be described an example in which as IEEE 1394 devices applied to the present embodiment, read only CD players (1), (2) and (3), an MD recorder/player capable of recording and reproducing, and a PC (personal computer) are connected to an STR (stereo tuner receiver) having a tuner function which can be provided with an analog input, by using an IEEE 1394 bus, which is an interface conforming to the IEEE 1394 format.

As apparatuses comprising an AV system, the STR, three CD players, i.e., the CD player (1) corresponding to the STR, the CD player (2) corresponding to the STR and the CD player (3) corresponding to the STR, the MD recorder/player corresponding to the STR, and the PC are included.

The STR functions as a center of the AV system. The STR mainly has a tuner function, an external source input selection function, and an amplifier function. For example, speakers SP (L) and (R) respectively of left and right channels corresponding to stereo sound can be connected to the STR.

As described later, the STR is so formed as to conduct selection on a broadcast signal received by an internal tuner section, an analog audio signal input, and a plurality of audio sources input from the outside via IEEE 1394 buses, and finally output a selected signal as sound from the speakers SP (L) and (R).

The STR also has a remote controller RM for conducting operation on the STR. The STR receives an operation command signal sent in response to operation conducted on the remote controller RM, and executes required operation according to the content of the operation command signal. Only the remote controller RM corresponding to the STR is given. However, other devices can also be operated by using the remote controller in the same way.

Furthermore, as device kinds capable of implementing various highly convenient system performances by connecting them together with the STR, the CD player (1) corresponding to the STR, the CD player (2) corresponding to the STR and the CD player (3) corresponding to the STR, the MD recorder/player corresponding to the STR, and the PC are also shown here.

Each of the CD player (1) corresponding to the STR, the CD player (2) corresponding to the STR and the CD player (3) corresponding to the STR has a function as a CD player and reproduces audio data recorded on a CD mounted thereon. Each of the CD players corresponding to the STR can send and output audio data reproduced from the CD, via the IEEE 1394 bus.

Furthermore, the MD recorder/player corresponding to the STR has a function capable of recording and reproducing audio data onto and from a MD, which is a rewritable optical magnetic disk. And the MD recorder/player corresponding to the STR can receive audio data sent via the IEEE 1394 bus and record the audio data on the MD. Furthermore, the MD recorder/player corresponding to the STR can reproduce audio data recorded on the MD and send and output the reproduced audio data via the IEEE 1394 bus.

Furthermore, the PC can send and output video data and audio data picked up by, for example, a video camera, via the IEEE 1394 bus.

In such an AV system, error messages corresponding to errors on the network caused by a device connected to the STR and errors within the STR are displayed on a display section of the STR. In addition, details can also be displayed. Furthermore, a user's measure table can also be displayed.

Furthermore, a system controller of the STR may obtain error information on the network on the basis of various kinds of information of a CFR (Configuration Register) provided in the IEEE 1394 interface circuit.

Furthermore, in the case where isochronous transfer is conducted in data transfer effected via the IEEE 1394 bus, the system controller of the STR needs to acquire information required for transmission from an IRM (Isochronous Resource Manager). However, the system controller of the STR may obtain error information on the network on the basis of various kinds of information of a CSR (Control and Status Register).

In the above described present embodiment, only an interface of the IEEE 1394 standards is shown as the interface section. As a matter of course, however, the present embodiment can be applied to other interfaces such as a USB (Universal Serial Bus).

[IEEE 1394 Serial Bus]

Further an outline of the IEEE 1394 serial bus (hereafter referred to as 1394 serial bus) applied to the interface of the present embodiment will now be described.

First, the connection form will be described. In the 1394 serial bus, the connection form is restricted, where a maximum of 63 devices can be connected to one bus by connecting the devices in a tree form having no loops. A port of each device transmits a received data signal continuously to another port. As a result, the data signal propagate throughout the bus.

The cable will now be described. The cable includes two sets of differential signal lines TPA and TPB, and a power supply pair VG (ground) and VP (power supply). By using two signal lines TPA and TPB, dynamic configuration of the bus, arbitration for acquiring the right to use the bus, and data signal propagation are conducted. The TPA is always provided with a bias. By detecting it in the TPB, it is determined whether there is active cable connection.

A signal of the physical layer section will now be described. Each of the two signal lines TPA and TPB assumes three values of "1", "0" and "Z". "Z" means a high impedance state, in which neither of the connected ports is driven. The TPA sends a signal called strobe, and the TPB sends data. The receiving side obtains a clock by finding exclusive OR of the data and strobe, and reads data at a change point of the clock.

Bus initialization will now be described. Each port determines whether a node is connected or removed, by detecting whether there is a bias output by the TPA of the opposite party of the connection. A node which has detected a change of the port connection state sends a bus reset signal to a certain port having other connection for a predetermined time. Another node which has received the bus reset signal further sends a bus reset signal to another port of the connection. This process is repeated. Finally, the bus reset signal is conveyed to all nodes connected to the bus. A node which has received a bus reset signal clears previous form information and its own node ID. Thereafter, each node recognizes itself as a branch in such a state that each of nodes connected to the bus is connected to a plurality of adjacent nodes or as a leaf having only one adjacent node. In addition, nodes are provided with parent-child relations, and root nodes in a tree structure are determined.

Asynchronous communication will now be described. As one of the data packet transfer methods used in the 1394 interface, there is asynchronous communication. This is unidirectional data packet transfer. The sending side describes a data packet transfer destination address in a packet header, and sends the data packet to the bus. The data packet is propagated to all nodes on the bus. A node corresponding to the transfer destination address described in the packet header receives the data packet as described above, and returns a receiving result (ack). The sequence of transfer processes is called asynchronous sub action.

For starting the asynchronous subaction, the bus must be in the idle state for a fixed time period called a subaction gap. Also while the receiving side is receiving the data packet and returning the ack, the bus assumes the idle state. This interval is called an ack gap. Since the ack gap is sufficiently short as compared with the subaction gap, another subaction is not started.

Isochronous communication will now be described. As another method among the data packet transfer methods used in the 1394 interface, there is isochronous communication. The isochronous communication is conducted in synchronism with a cycle start packet sent by a cycle master, which exists on the bus by itself, at fixed intervals. Upon receiving the cycle start packet, a node of the sending side of the isochronous communication starts arbitration after waiting an isochronous gap, and sends an isochronous packet. In the case where there is another sending node, arbitration is started in succession with the isochronous gap, and an isochronous packet is sent.

Here, the isochronous gap is sufficiently short as compared with the subaction gap. Even if there is a node which desires to conduct asynchronous communication during the isochronous gap, the subaction gap cannot be detected and consequently sending cannot be conducted. In other words, a node which sends an isochronous packet is given priority every cycle. Furthermore, unlike the asynchronous communication, in the isochronous communication the address of data transfer destination is not specified and broadcast to the bus is conducted. Channel numbers of 0 to 63 are assigned to isochronous packets. Each node can receive isochronous packets having required channel numbers.

For example, in the case where the interface conforms to the IEEE 1394 format and devices can be controlled by an AV/C command, a device has information called subunit type, which indicates the function of the device.

Here, the unit means the digital device itself, and the subunit takes charge of the function of the digital device.

Therefore, a combination of subunits forms a unit. How to divide the unit into function units is determined appropriately.

For example, as a digital device, the STR unit can be considered to be a combination of a tuner subunit (receiving function) and an analog input subunit. As for the compact disc (CD) unit, a combination of compact disk recorder subunits (reproducing functions) can be considered. As for the mini disc (MD) unit, a combination of mini disc recorder/player subunits (recording function/reproducing function) can be considered. As for a digital television (DTV) unit, a combination of a tuner subunit (receiving function) and a monitor subunit can be considered. Furthermore, as for a video tape recorder unit integral with a television, a combination of a tuner subunit (receiving function), a monitor subunit, and a tape recorder/player subunit (recording function/reproducing function) can be considered. In this way, suitable subunits are determined as function units.

The above described subunits are virtual function units and they do not necessarily coincide with actual circuit configuration. Furthermore, for example, in a circuit, there are blocks which do not belong to any subunits. Blocks which need not be controlled by an AV/C command, such as a decoder block, are an example thereof.

According to the above described present embodiment, it is possible to notify the user of an abnormal state of the network system intelligibly by displaying a message.

In addition to an alarm of an abnormal state using a message, an action to be taken by the user is indicated by a user's measure display. As a result, it is possible to urge the user to take an action to avoid an error.

Furthermore, it is possible to make a distinction in recognition among an abnormality of a device of opposite party of communication on the network, an abnormal state of hardware of the device itself, and an abnormal state of the whole network.

Since an error message is displayed intelligibly for the user, special knowledge concerning the network is not required and the user can take an action by watching only the display.

In an IEEE 1394 network, a network error display apparatus of the present invention includes: first detection means for detecting an error of a loop state of the network; second detection means for detecting a link state for the network; third detection means for detecting an error which occurs in case where such a state that there is no link for the network is detected by the second detection means; fourth detection means for detecting an error which occurs in case where such a state that there is a link for the network is detected by the second detection means; storage means for storing respective messages indicating error states detected respectively by the detection means; display means for displaying a message for a user; and control means for reading out a message which indicates error states from the storage means based on error states detected respectively by the plurality of detection means, and displaying the message on the display means. Therefore, the following effects are brought about. A user's measure can be displayed intelligibly while making a distinction between an error of the receiving system on the network and an error within a device. In addition, when error information is detected, then the error can be displayed according to an display priority order of the error information. Even if some error information pieces are detected simultaneously, only one of them can be displayed as an error in order to prevent the user from being confused. Furthermore, if error information having a high display priority order is detected even in the case an error has already been displayed, the error display which is currently displayed is interrupted and display processing of the error information having the high display priority order can be conducted.

In the network error display apparatus of the present invention, the third detection means detects at least such a state that communication with another apparatus via the network is impossible, and such a state that a band required for data transmission cannot be secured on the network. This brings about the following effects. As for error information concerning connection of isochronous transmission which has occurred during the connection processing of isochronous transmission, error causes, such as at least such a state that communication with another apparatus via the network cannot be conducted and such a state that a band cannot be obtained, can be extracted successively from the error information according to a procedure of connection processing, and error display can be conducted.

In the network error display apparatus of the present invention, the fourth detection means detects at least such a state that a signal cannot be obtained from the network, and such a state that a signal on data is not a predetermined signal. This brings about the following effects. As for error information concerning data of isochronous transmission which has occurred after connection processing completion of isochronous transmission, the display priority order is defined in the order of at least such a state that a signal cannot be obtained from the network, and such a state that a signal is not a predetermined signal, and error display can be conducted.

In the network error display apparatus of the present invention, there is further provided fifth detection means for detecting connection of a new apparatus to the network or cancel of connection of an apparatus from the network, and a state of the network detected by the fifth detection means is displayed. This brings about the following effects. When a new apparatus is connected to the network, an error state can be displayed. When an apparatus is removed, display so as to avoid an error can be conducted.

In the network error display apparatus of the present invention, the plurality of control means reads out from the storage means to thereby display the message on said display means based on priority order for states of the network detected by the plurality of detection means. This brings about an effect that error display can be conducted according to display priority order based on the degree of emergency.

In a network using an IEEE 1394, an error detection display method of the present invention includes: a step of detecting a loop state error of the network, and, in case where the loop state error is detected, displaying the loop state error; a step of detecting a connection state with another apparatus via the network; in case where connection is detected in the connection state detecting step, detecting an error of the network, and in case where an error of the network is detected, displaying an error message based on detected error contents; and in case where connection is not detected in the connection state detecting step, detecting an error of the network, and in case where an error of the network is detected, displaying an error message based on detected error contents. Therefore, the following effects are brought about. A user's measure can be displayed intelligibly while making a distinction between an error of the receiving system on the network and an error within a device. In addition, when error information is detected, then the error can be displayed according to an display priority order of the error information. Even if some error information pieces are detected simultaneously, only one of them can be displayed as an error in order to prevent the user from being confused. Furthermore, if error information having a high display priority order is detected even in the case an error has already been displayed, the error display which is currently displayed is interrupted and display processing of the error information having the high display priority order can be conducted.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A network error display apparatus in an IEEE 1394 network, said network error display apparatus comprising:
    first detection means for detecting an error of a loop state of said network;
    second detection means for detecting a link state for said network;
    third detection means for detecting an error which occurs in case where such a state that there is no link for said network is detected by said second detection means;
    fourth detection means for detecting an error which occurs in case where such a state that there is a link for said network is detected by said second detection means;
    storage means for storing respective messages indicating error states detected respectively by said detection means;
    display means for displaying a message for a user; and
    control means for reading out a message which indicates error states from said storage means based on error states detected respectively by said plurality of detection means, and displaying the message on said display means.

2. The network error display apparatus according to claim 1, wherein said third detection means detects at least such a state that communication with another apparatus via the network is impossible, and such a state that a band required for data transmission cannot be secured on said network.

3. The network error display apparatus according to claim 1, wherein said fourth detection means detects at least such a state that a signal cannot be obtained from the network, and such a state that a signal on data is not a predetermined signal.

4. The network error display apparatus according to claim 1, wherein:
    said network error display apparatus further comprises fifth detection means for detecting connection of a new apparatus to said network or cancel of connection of an apparatus from said network, and
    a state of the network detected by said fifth detection means is displayed.

5. The network error display apparatus according to claim 1, wherein said plurality of control means reads out a message from said storage means to thereby display the message on said display means based on priority order for states of said network detected by the plurality of detection means.

6. An error detection display method in a network using IEEE 1394, comprising the steps of:
    detecting a loop state error of said network, and, in case where said loop state error is detected, displaying said loop state error;
    detecting a connection state with another apparatus via said network;
    in case where connection is detected in said connection state detecting step, detecting an error of said network, and in case where an error of said network is detected, displaying an error message based on detected error contents; and
    in case where connection is not detected in said connection state detecting step, detecting an error of said network, and in case where an error of the network is detected, displaying an error message based on detected error contents.

* * * * *